United States Patent
Lietz et al.

(10) Patent No.: US 9,319,415 B2
(45) Date of Patent: Apr. 19, 2016

(54) METHOD AND SYSTEM FOR PROVIDING REFERENCE ARCHITECTURE PATTERN-BASED PERMISSIONS MANAGEMENT

(71) Applicant: Intuit Inc., Mountain View, CA (US)

(72) Inventors: M. Shannon Lietz, San Marcos, CA (US); Luis Felipe Cabrera, Bellevue, WA (US); Christian Price, San Diego, CA (US); Michelle Nikulshin, Carlsbad, CA (US); Javier Godinez, Bonita, CA (US); Sabu Kuruvila Philip, Redwood City, CA (US); Brad A. Rambur, Carlsbad, CA (US); Scott Cruickshanks Kennedy, San Diego, CA (US); Erik Thomas Naugle, Alpine, CA (US)

(73) Assignee: Intuit Inc., Mountain View, CA (US)

( * ) Notice: Subject to any disclaimer, the term of this patent is extended or adjusted under 35 U.S.C. 154(b) by 73 days.

(21) Appl. No.: 14/266,107

(22) Filed: Apr. 30, 2014

(65) Prior Publication Data
US 2015/0319177 A1    Nov. 5, 2015

(51) Int. Cl.
H04L 29/06    (2006.01)

(52) U.S. Cl.
CPC ............ *H04L 63/105* (2013.01); *H04L 63/102* (2013.01)

(58) Field of Classification Search
None
See application file for complete search history.

(56) References Cited

U.S. PATENT DOCUMENTS

| 5,731,991 A | 3/1998 | Kinra et al. |
| 6,085,224 A | 7/2000 | Wagner |
| 6,205,552 B1 | 3/2001 | Fudge |
| 6,343,236 B1 | 1/2002 | Gibson et al. |
| 6,651,183 B1 | 11/2003 | Gensler et al. |

(Continued)

FOREIGN PATENT DOCUMENTS

| WO | WO 02/091182 | 11/2002 |
| WO | WO 2013/067404 | 5/2013 |
| WO | WO 2015/102776 | 7/2015 |

OTHER PUBLICATIONS

Lietz et al., "Method and System for Dynamic and Comprehensive Vulnerability Management," U.S. Appl. No. 14/052,971, filed Oct. 14, 2013.

(Continued)

*Primary Examiner* — Michael R Vaughan
(74) *Attorney, Agent, or Firm* — Hawley Troxell Ennis & Hawley LLP; Philip McKay

(57) ABSTRACT

Reference architecture pattern role data representing reference architecture pattern roles to be associated with entities taking part in the development, and/or deployment, and/or operation of an application is generated. Reference architecture pattern tier data representing reference architecture pattern tiers used to create, and/or deploy, and/or operate an application using the reference architecture pattern is generated. For each reference architecture pattern role at least one access and/or operational permission is associated with each reference architecture pattern tier. At least one entity is assigned one of the reference architecture pattern roles and for each reference architecture pattern tier, the at least one entity is automatically provided the at least one access and/or operational permission associated with the reference architecture pattern role assigned to the entity.

32 Claims, 6 Drawing Sheets

(56) References Cited

U.S. PATENT DOCUMENTS

| | | | |
|---|---|---|---|
| 7,114,183 B1 | 9/2006 | Joiner | |
| 7,296,261 B2 | 11/2007 | Witchel et al. | |
| 7,506,371 B1 | 3/2009 | Ben-Natan | |
| 7,552,424 B1 | 6/2009 | Bischof et al. | |
| 7,640,458 B2 | 12/2009 | Rao et al. | |
| 7,788,235 B1 | 8/2010 | Yeo | |
| 7,792,256 B1 | 9/2010 | Arledge et al. | |
| 7,925,527 B1* | 4/2011 | Flam | G06F 17/30398 705/7.26 |
| 7,944,355 B2 | 5/2011 | Kumar et al. | |
| 7,996,836 B1 | 8/2011 | McCorkendale et al. | |
| 8,171,554 B2 | 5/2012 | Elovici et al. | |
| 8,181,036 B1 | 5/2012 | Nachenberg | |
| 8,312,516 B1* | 11/2012 | Malatesta | G06F 21/6218 707/783 |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,615,785 B2 | 12/2013 | Elrod et al. | |
| 8,813,225 B1* | 8/2014 | Fuller | H04L 63/10 726/23 |
| 9,049,105 B1 | 6/2015 | Feinstein et al. | |
| 2002/0099992 A1 | 7/2002 | Distler et al. | |
| 2002/0116404 A1 | 8/2002 | Cha et al. | |
| 2003/0051154 A1 | 3/2003 | Barton et al. | |
| 2003/0084327 A1 | 5/2003 | Lingafelt et al. | |
| 2003/0195959 A1 | 10/2003 | Labadie et al. | |
| 2004/0181775 A1* | 9/2004 | Anonsen | G06Q 10/10 717/104 |
| 2004/0237093 A1 | 11/2004 | Sluiman et al. | |
| 2005/0066309 A1 | 3/2005 | Creamer et al. | |
| 2005/0091304 A1 | 4/2005 | Trayler | |
| 2005/0172162 A1 | 8/2005 | Takahashi et al. | |
| 2005/0193269 A1 | 9/2005 | Haswell et al. | |
| 2005/0204151 A1 | 9/2005 | Fang et al. | |
| 2006/0101520 A1 | 5/2006 | Schumaker et al. | |
| 2006/0293940 A1 | 12/2006 | Tsyganskiy et al. | |
| 2007/0027999 A1 | 2/2007 | Allen et al. | |
| 2007/0079168 A1 | 4/2007 | Sivakumar et al. | |
| 2007/0094711 A1 | 4/2007 | Corley et al. | |
| 2007/0180509 A1 | 8/2007 | Swartz et al. | |
| 2007/0185875 A1* | 8/2007 | Chang | G06F 21/6218 |
| 2007/0250424 A1 | 10/2007 | Kothari | |
| 2008/0016570 A1 | 1/2008 | Capalik | |
| 2008/0025288 A1 | 1/2008 | Benner et al. | |
| 2008/0044018 A1 | 2/2008 | Scrimsher et al. | |
| 2008/0262990 A1 | 10/2008 | Kapoor et al. | |
| 2008/0263670 A1 | 10/2008 | Stavrica | |
| 2008/0295076 A1 | 11/2008 | McKain et al. | |
| 2009/0007264 A1 | 1/2009 | Chatterjee et al. | |
| 2009/0089682 A1 | 4/2009 | Baier et al. | |
| 2009/0106838 A1 | 4/2009 | Clark et al. | |
| 2009/0199273 A1 | 8/2009 | Yalamanchi | |
| 2009/0254990 A1 | 10/2009 | McGee | |
| 2009/0288078 A1 | 11/2009 | Makonahalli et al. | |
| 2009/0300045 A1 | 12/2009 | Chaudhry et al. | |
| 2009/0300423 A1 | 12/2009 | Ferris | |
| 2009/0319527 A1 | 12/2009 | King et al. | |
| 2010/0077203 A1 | 3/2010 | Ogawa et al. | |
| 2010/0122317 A1 | 5/2010 | Yadav | |
| 2010/0251363 A1 | 9/2010 | Todorovic | |
| 2010/0269121 A1 | 10/2010 | Montesissa et al. | |
| 2010/0318481 A1 | 12/2010 | Feynman | |
| 2011/0034182 A1 | 2/2011 | Issa et al. | |
| 2011/0055921 A1 | 3/2011 | Narayanaswamy et al. | |
| 2011/0138469 A1 | 6/2011 | Ye et al. | |
| 2011/0145657 A1 | 6/2011 | Bishop et al. | |
| 2011/0208677 A1 | 8/2011 | Zhou et al. | |
| 2011/0238855 A1 | 9/2011 | Korsunsky et al. | |
| 2012/0039336 A1 | 2/2012 | Richmond et al. | |
| 2012/0072985 A1 | 3/2012 | Davne et al. | |
| 2012/0151488 A1 | 6/2012 | Arcese et al. | |
| 2012/0185390 A1 | 7/2012 | Palnitkar et al. | |
| 2012/0185913 A1 | 7/2012 | Martinez et al. | |
| 2012/0209947 A1 | 8/2012 | Glaser et al. | |
| 2012/0210437 A1 | 8/2012 | Karande et al. | |
| 2012/0233668 A1 | 9/2012 | Leafe et al. | |
| 2012/0303776 A1 | 11/2012 | Ferris | |
| 2012/0304300 A1 | 11/2012 | LaBumbard | |
| 2012/0311157 A1 | 12/2012 | Erickson et al. | |
| 2012/0324576 A1 | 12/2012 | Clark et al. | |
| 2013/0019242 A1 | 1/2013 | Chen et al. | |
| 2013/0046667 A1 | 2/2013 | Hill et al. | |
| 2013/0054792 A1 | 2/2013 | Sharaf | |
| 2013/0055398 A1 | 2/2013 | Li et al. | |
| 2013/0067067 A1 | 3/2013 | Miri et al. | |
| 2013/0091376 A1 | 4/2013 | Raspudic et al. | |
| 2013/0117809 A1 | 5/2013 | McDougal et al. | |
| 2013/0160072 A1 | 6/2013 | Reus et al. | |
| 2013/0247135 A1 | 9/2013 | Kundu et al. | |
| 2013/0291087 A1 | 10/2013 | Kailash et al. | |
| 2013/0305357 A1 | 11/2013 | Ayyagari et al. | |
| 2013/0339514 A1 | 12/2013 | Crank et al. | |
| 2013/0347131 A1 | 12/2013 | Mooring et al. | |
| 2014/0013452 A1 | 1/2014 | Aissi et al. | |
| 2014/0026122 A1 | 1/2014 | Markande et al. | |
| 2014/0026179 A1 | 1/2014 | Devarajan et al. | |
| 2014/0068784 A1 | 3/2014 | Merkow et al. | |
| 2014/0082621 A1 | 3/2014 | Fitzgerald et al. | |
| 2014/0258446 A1 | 9/2014 | Bursell | |
| 2014/0258715 A1 | 9/2014 | Rodniansky | |
| 2014/0282840 A1 | 9/2014 | Guinan | |
| 2014/0317737 A1 | 10/2014 | Shin et al. | |
| 2014/0344933 A1 | 11/2014 | Huh et al. | |
| 2015/0032587 A1* | 1/2015 | Broom | G06Q 40/00 705/35 |
| 2015/0052108 A1 | 2/2015 | Volk et al. | |
| 2015/0052402 A1 | 2/2015 | Gurumurthy et al. | |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.

Lietz et al., "Method and System for Creating Enriched Log Data," U.S. Appl. No. 14/139,449, filed Dec. 23, 2013.

Cabrera et al., "Method and System for Intrusion and Extrusion Detection," U.S. Appl. No. 14/143,999, filed Dec. 30, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Lietz et al., "Method and System for Providing Security Aware Applications," U.S. Appl. No. 14/247,131, filed Apr. 7, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

(56) References Cited

OTHER PUBLICATIONS

Lietz et al., "Method and System for Detecting Irregularities and Vulnerabilities in Dedicated Hosting Environments," U.S. Appl. No. 14/266,018, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

* cited by examiner

REFERENCE ARCHITECTURE PATTERN-BASED
PERMISSIONS MANAGEMENT PLAN 1

| PATTERN 1 ROLES | PATTERN 1 TIER 1 (ACCOUNT P11) | PATTERN 1 TIER 2 (ACCOUNT P12) |
|---|---|---|
| (P1) SuperAdmin | Broad Permissions | Super-Broad Permissions |
| (P1) Security | Forensic Permissions | Forensic Permissions |
| (P1) Admin | Broad Permissions | Moderate Permissions |
| (P1) Operator | Narrow Permissions | Moderate Permissions |
| (P1) Developer | Admin Permissions | Integrator Permissions |
| (P1) 3rd Party | Integrator Permissions | Broad End-User Permissions |
| (P1) User | End-User Permissions | Narrow End-User Permissions |
| (P1) Read-Only | Read-Only Permissions | Narrow Read-Only Permissions |

FIG. 2

REFERENCE ARCHITECTURE PATTERN-BASED PERMISSIONS MANAGEMENT PLAN 2

| PATTERN 2 ROLES | PATTERN 2 TIER 1 (ACCOUNT P21) | PATTERN 2 TIER 2 (ACCOUNT P22) | PATTERN 2 TIER 3 (ACCOUNT P23) |
|---|---|---|---|
| (P2) SuperAdmin | Super-Broad Permissions | Broad Permissions | Moderate Permissions |
| (P2) Security | Forensic Permissions | Broad Permissions | Moderate Permissions |
| (P2) Admin | Broad Permissions | Moderate Permissions | Operator Permissions |
| (P2) Operator | Narrow Permissions | Moderate Permissions | Operator Permissions |
| (P2) Developer | Admin Permissions | Integrator Permissions | Narrow Permissions |
| (P2) 3rd Party | Integrator Permissions | Broad End-User Permissions | Application Permissions |
| (P2) User | Broad End-User Permissions | Narrow End-User Permissions | Narrow Read-Only Permissions |
| (P2) Read-Only | Broad Read-Only Permissions | Moderate Read-Only Permissions | Narrow Read-Only Permissions |

FIG. 3

REFERENCE ARCHITECTURE PATTERN-BASED PERMISSIONS MANAGEMENT PLAN 3

| PATTERN 3 ROLES | PATTERN 3 TIER 1 (ACCOUNT P31) | PATTERN 3 TIER 2 (ACCOUNT P32) | PATTERN 3 TIER 3 (ACCOUNT P33) | PATTERN 3 TIER 4 (ACCOUNT P34) |
|---|---|---|---|---|
| (P3) SuperAdmin | Broad Permissions | Super-Broad Permissions | Admin Permissions | Narrow Permissions |
| (P3) Security | Forensic Permissions | Forensic Permissions | Broad Permissions | Admin Permissions |
| (P3) Admin | Broad Admin Permissions | Narrow Permissions | Moderate Permissions | Read-Only Permissions |
| (P3) Operator | Narrow Operator Permissions | Narrow Permissions | Moderate Operator Permissions | End-User Permissions |
| (P3) Developer | Super-Broad Permissions | Broad Permissions | Admin Permissions | End-User Permissions |
| (P3) 3rd Party | Integrator Permissions | End-User Permissions | Integrator Permissions | End-User Permissions |
| (P3) User | Narrow Read-Only Permissions | Read-Only Permissions | Narrow End-User Permissions | Broad End-User Permissions |
| (P3) Read-Only | Narrow Read-Only Permissions | Moderate Read-Only Permissions | Read-Only Permissions | Broad Read-Only Permissions |

FIG. 4

METHOD AND SYSTEM FOR PROVIDING REFERENCE ARCHITECTURE PATTERN-BASED PERMISSIONS MANAGEMENT

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models.

Historically, in an effort to control access provided to entities charged with taking part in the development, and/or deployment, and/or operation of an application, the security industry has employed role-based access and permission control and management systems to try and ensure that only authorized entities, such as individual persons, can access specific systems, applications, and resources within traditional data centers. While role-based access and permission control and management was arguably effective when used in traditional data center hardware defined environments, within a software defined environment, such as a cloud computing environment, role-based access and permission control and management systems create a great deal of complexity and inefficiency. This is due in part to the fact that, using traditional role-based access and permission control and management, each stage of each individual application's development, deployment, and operation requires numerous, largely customized, roles to be defined for each entity, each with a set of permissions further customized to that entity, and customized with respect to each stage of development of each individual application. To make matters worse, this process must typically be repeated for each application and/or service.

The situation described above represents a significant issue that must be resolved before highly sensitive data, such as financial data, can be safely and efficiently processed in a cloud computing environment.

What is needed is a permissions management system centered on reference architecture patterns, e.g., blueprints, cookbooks, and templates, for various types, or classes of applications. Then these reference architecture pattern-based permission management systems can be used for multiple applications of the same reference architecture pattern type and the permissions for a given entity can be automatically assigned and provided based on the reference architecture pattern in use, and the tier or account associated with the reference architecture pattern being utilized/accessed, and the role assigned to the entity within the reference architecture pattern.

SUMMARY

In accordance with one embodiment, a method and system for providing reference architecture pattern-based permissions management includes defining one or more reference architecture patterns for the development, and/or deployment, and/or operation of an application, or application type.

In one embodiment, one or more reference architecture pattern roles to be associated with entities taking part in the development, and/or deployment, and/or operation of an application using a reference architecture pattern are identified. In one embodiment, reference architecture pattern role data representing the identified reference architecture pattern roles is generated.

In one embodiment, for each reference architecture pattern, reference architecture pattern tiers used to create, and/or deploy, and/or operate an application using the reference architecture pattern are identified. In one embodiment, reference architecture pattern tier data representing the reference architecture pattern tiers is generated.

In one embodiment, for each reference architecture pattern, and for each reference architecture pattern role represented by the reference architecture pattern role data, at least one access and/or operational permission is associated with each reference architecture pattern tier represented in the reference architecture pattern tier data.

In one embodiment, for each reference architecture pattern, at least one entity is assigned one of the reference architecture pattern roles represented by the reference architecture pattern role data and, for each reference architecture pattern tier represented in the reference architecture pattern tier data, the at least one entity is automatically provided the at least one access and/or operational permission associated with the reference architecture pattern role assigned to the entity.

BRIEF DESCRIPTION OF THE DRAWINGS

FIG. 2 is an illustrative example of a relational diagram for a two tier reference architecture pattern-based permissions management plan in accordance with one embodiment;

FIG. 3 is an illustrative example of a relational diagram for a three tier reference architecture pattern-based permissions management plan in accordance with one embodiment;

FIG. 4 is an illustrative example of a relational diagram for a four tier reference architecture pattern-based permissions management plan in accordance with one embodiment;

Figure 1:
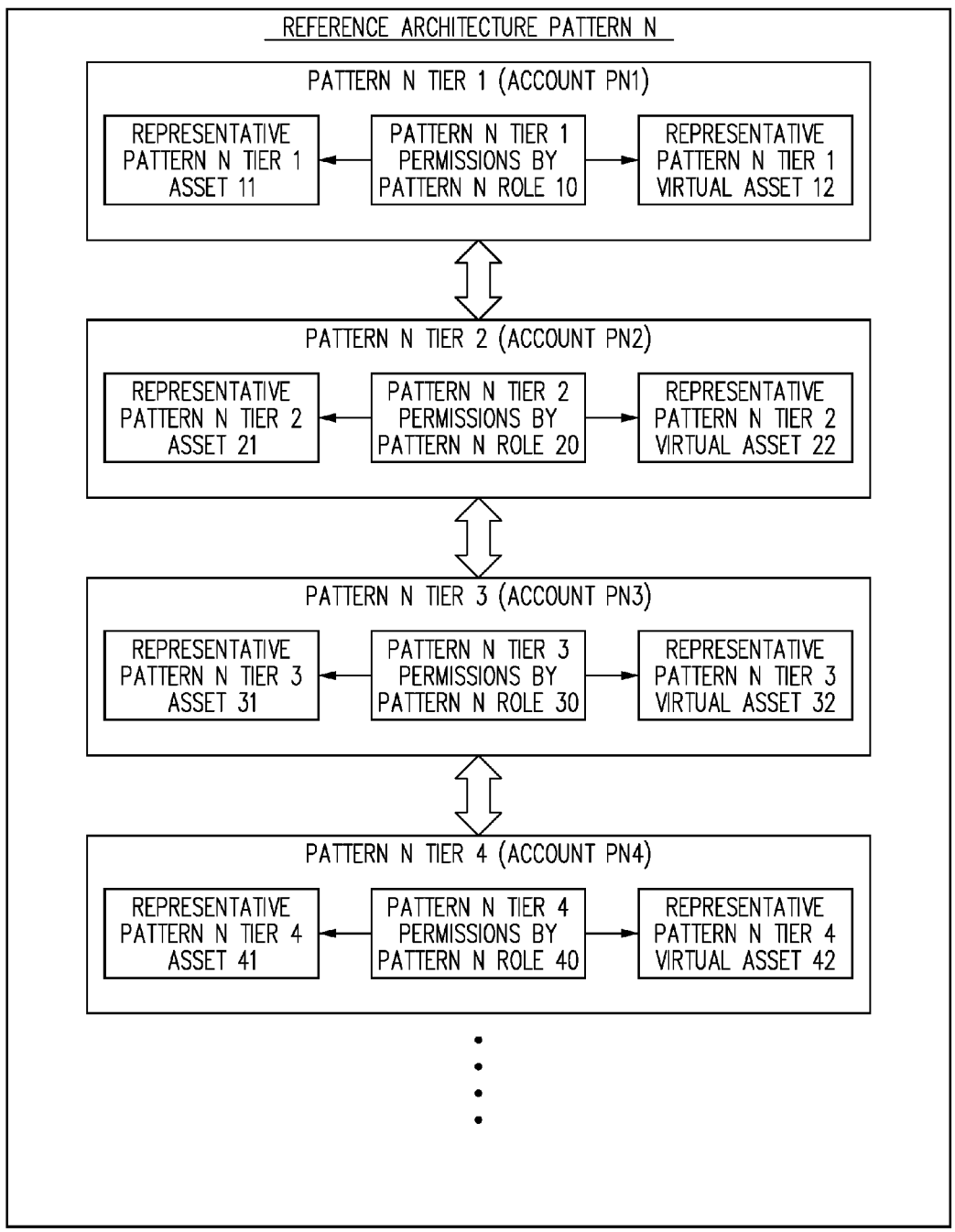
FIG. 1 is a high level functional block diagram of an exemplary reference architecture pattern in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment, permissions provided to a given entity, such as a person, taking part in the various stages of the development, deployment, and operation of an application are determined based on a role assigned to the entity, and the reference architecture pattern associated with the application, and the tier, e.g., the cloud computing infrastructure provider account, of the reference architecture pattern currently being accessed or used by the entity. Consequently, using the methods and systems for providing reference architecture pattern-based permissions management discussed herein, a single role assigned to an entity correlates to different access, operational, and functional permissions depending on the reference architecture pattern and the tier of the reference architecture pattern being accessed.

In one embodiment, multiple reference architecture pattern-based permission management plans for various types, or classes, of applications are defined. Then these reference architecture pattern-based permission management plans are used for multiple applications of the same reference architecture pattern type and the permissions for a given entity can be automatically assigned and provided based on the reference architecture pattern in use, the tier or account associated with the reference architecture pattern being utilized/accessed, and the role assigned to the entity within the reference architecture pattern.

In accordance with one embodiment, a method and system for providing reference architecture pattern-based permissions management includes a process for providing reference architecture pattern-based permissions management used to implement an application, at least in part, in a production environment.

Herein, the term "production environment" includes the various components, or assets, used to deploy, implement, access, and use, a given application as that application is intended to be used. In various embodiments, production environments include multiple assets that are combined; communicatively coupled; virtually and/or physically connected; and/or associated with one another, to provide the production environment implementing the application.

As specific illustrative examples, the assets making up a given production environment can include, but are not limited to, one or more computing environments used to implement the application in the production environment such as a data center, a cloud computing environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors or other systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store or buffer data; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system" and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

In accordance with one embodiment, a method and system for providing reference architecture pattern-based permissions management includes a process for providing reference architecture pattern-based permissions management used to create, and/or deploy, and/or operate an application using one or more assets and/or virtual assets in one or more computing environments, including, in one embodiment, a cloud computing environment.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the assets, infrastructure, communication and networking systems, and security systems associated with the computing systems and/or virtual assets making up the trusted computing environment, are either under the control of, or known to, a party. In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party.

In various embodiments, each computing environment includes allocated assets and virtual assets associated with, and controlled or used to create, and/or deploy, and/or operate an application.

Examples of trusted computing environments include the assets and components making up data centers associated with, and/or controlled by, an application and/or any computing systems and/or virtual assets, and/or networks of computing systems and/or virtual assets, associated with, known by, and/or controlled by, an application. Examples of untrusted computing environments include, but are not limited to, public networks, such as the Internet, various cloud-based computing environments, and various other forms of distributed computing systems.

It is often the case that to create, and/or deploy, and/or operate an application, data must be transferred to, and/or from, a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related, or similar, cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or any other organization of fundamental elements, or sets of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

In one embodiment, one or more reference architecture patterns to be used in connection with the development, and/or deployment, and/or operation of an application or application type are defined.

In one embodiment, the reference architecture patterns represent the "blueprints" or "recipes" indicating the usage and interconnection of steps, stages, and/or tiers used to develop, deploy, and/or operate an associated class, or type, of application associated with each of the reference architecture patterns.

In various embodiments, each of the different types of reference architecture patterns is associated with a type, or class, of applications where the same number of tiers, and types of tiers, are utilized and interconnected to develop, deploy, and/or operate the applications.

As a specific illustrative example, in one embodiment, a specific reference architecture pattern may be defined and associated with two tier applications where the two tiers used to develop, deploy, and/or operate the applications are a development tier and a production tier.

As another illustrative example, in one embodiment, a specific reference architecture pattern may be defined and associated with three tier applications where the three tiers include a development tier, a pre-production tier, and a production tier.

As another illustrative example, in one embodiment, a specific reference architecture pattern may be defined and associated with three-tier applications were the three tiers include a development tier, a production tier, and a web tier.

As another illustrative example, in one embodiment, a specific reference architecture pattern may be defined and associated with four tier applications were the four tiers include a development tier, a pre-production tier, a production tier, and a staging tier.

As another illustrative example, in one embodiment, a specific reference architecture pattern may be defined and associated with four tier applications were the four tiers include a development tier, a production tier, an integration tier, and a security tier.

As another illustrative example, in one embodiment, a specific reference architecture pattern may be defined and associated with five tier applications were the five tiers include a development tier, a pre-production tier, a production tier, a staging tier, and an integration tier.

As another illustrative example, in one embodiment, a specific reference architecture pattern may be defined and associated with five tier applications were the five tiers include a development tier, a pre-production tier, a production tier, a staging tier, and an external user tier.

As another illustrative example, in one embodiment, a specific reference architecture pattern may be defined and associated with five tier applications were the five tiers include a development tier, a pre-production tier, a production tier, a staging tier, and security tier.

As another illustrative example, in one embodiment, a specific reference architecture pattern may be defined and associated with six tier applications were the six tiers include a development tier, a pre-production tier, a production tier, a staging tier, an integration tier, and a security tier.

As another illustrative example, in one embodiment, a specific reference architecture pattern may be defined and associated with seven tier applications were the seven tiers include a development tier, a pre-production tier, a production tier, a staging tier, an integration tier, a security tier, and an external tier.

As can be seen from the specific illustrative examples above, in various embodiments, the reference architecture patterns can be defined and associated with application types, or classes, that are developed, deployed, and operated, utilizing any number of tiers, with each of the tiers being any one of numerous tier types. In various embodiments, a given reference architecture pattern is defined by the specific number of tiers, and the specific type of tiers, used to develop, deploy, and operate the type, or class, of applications associated with the reference architecture pattern. Consequently, in various embodiments, multiple reference architecture patterns associated with multiple classes, or types, of applications are defined.

In various embodiments, the reference architecture pattern tiers associated with the reference architecture patterns represent various stages or functionality used to develop, deploy, and/or operate the applications. In various embodiments, the tiers associated with the reference architecture patterns include, but are not limited to, one or more of a development tier; a pre-production tier; a production tier; a staging tier; an integration tier; an external tier; a security tier; and/or any other tier representing a stage or functional operability associated with the development, deployment, or operation of an application, and/or class of applications.

In various embodiments, and particularly those where the applications are to be deployed and operated in a cloud computing infrastructure, each of the reference architecture pattern tiers is, or is associated with, a separate cloud computing infrastructure account provided through a cloud computing infrastructure provider. Consequently, in various embodiments, the reference architecture pattern tiers associated with the reference architecture patterns include, but are not limited to, one or more of a development account; a pre-production account; a production account; a staging account; an integration account; an external account; a security account, and/or any other cloud computing infrastructure account associated with a stage or functional operability in the development, deployment, or operation of an application, and/or class of applications.

In various embodiments, each of the reference architecture pattern tiers or cloud computing infrastructure accounts has associated resources allocated to it that are used to implement the functionality associated with each of the reference architecture pattern tiers or cloud computing infrastructure accounts. In various embodiments, the resources allocated to the reference architecture pattern tiers include, but are not limited to, any of the assets, virtual assets, and/or other production environment components discussed herein and/or defined above, and/or as known in the art at the time of filing, and/or as developed after the time of filing.

FIG. 1 is a high level functional block diagram of an exemplary reference architecture pattern N in accordance with one embodiment. As seen in FIG. 1, exemplary reference architecture pattern N includes, four reference architecture pattern tiers, or cloud computing infrastructure accounts, including, pattern N tier 1, or account PN1; pattern N tier 2, or account PN2; pattern N tier 3, or account PN3; and pattern N tier 4, or account PN4.

Those of skill in the art will readily recognize that, as stated above, in various embodiments, the reference architecture patterns can be defined and associated with application types or classes that are developed, deployed, and operated, utilizing any number of reference architecture pattern tiers or cloud computing infrastructure accounts, with each of the tiers/accounts being any one of numerous tier/account types.

Consequently, the specific illustrative example of FIG. 1, and reference architecture pattern N, is not limiting and, in various embodiments, a given reference architecture pattern is defined by the specific number of tiers/accounts, and the specific type of tiers/accounts, used to develop, deploy, and operate the type, or class, of applications associated with the reference architecture pattern. Consequently, in various embodiments, multiple reference architecture patterns associated with multiple classes, or types, of applications are defined, including those distinct from the specific illustrative example of FIG. 1.

As also seen in FIG. 1, each of the four tiers or accounts, i.e., pattern N tier 1, or account PN1; pattern N tier 2, or account PN2; pattern N tier 3, or account PN3; and pattern N tier 4, or account PN4, of exemplary reference architecture pattern N includes allocated resources, shown as representative assets and representative virtual assets in FIG. 1. Specifically, pattern N tier 1, or account PN1, includes allocated resources shown as representative pattern N tier 1 asset 11 and representative pattern N tier 1 virtual asset 12. Likewise, pattern N tier 2, or account PN2, includes allocated resources shown as representative pattern N tier 2 asset 21 and representative pattern N tier 2 virtual asset 22. Similarly, pattern N tier 3, or account PN3, includes allocated resources shown as representative pattern N tier 3 asset 31 and representative pattern N tier 3 virtual asset 32. Likewise, pattern N tier 4, or account PN4, includes allocated resources shown as representative pattern N tier 4 asset 41 and representative pattern N tier 4 virtual asset 42.

Those of skill in the art will readily recognize that while single representative assets, i.e., representative pattern N tier 1 asset 11, representative pattern N tier 2 asset 21, representative pattern N tier 3 asset 31, and representative pattern N tier 4 asset 41 are shown in FIG. 1, each of representative pattern N tier 1 asset 11, representative pattern N tier 2 asset 21, representative pattern N tier 3 asset 31, and representative pattern N tier 4 asset 41 can represent two or more assets.

Likewise, those of skill in the art will readily recognize that while single representative virtual assets, i.e., representative pattern N tier 1 virtual asset 12, representative pattern N tier 2 virtual asset 22, representative pattern N tier 3 virtual asset 32, and representative pattern N tier 4 virtual asset 42 are shown in FIG. 1, each of representative pattern N tier 1 virtual asset 12, representative pattern N tier 2 virtual asset 22, representative pattern N tier 3 virtual asset 32, and representative pattern N tier 4 virtual asset 42 can represent two or more virtual assets.

As discussed in more detail below, for each of the four reference architecture pattern tiers or cloud computing infrastructure accounts, i.e., pattern N tier 1, or account PN1; pattern N tier 2, or account PN2; pattern N tier 3, or account PN3; and pattern N tier 4, or account PN4, of exemplary reference architecture pattern N, access permissions are required to access the allocated resources, i.e., to access representative pattern N tier 1 asset 11, representative pattern N tier 2 asset 21, representative pattern N tier 3 asset 31, representative pattern N tier 4 asset 41, representative pattern N tier 1 virtual asset 12, representative pattern N tier 2 virtual asset 22, representative pattern N tier 3 virtual asset 32, and representative pattern N tier 4 virtual asset 42.

In addition, as also discussed in more detail below, the access permissions required to access the allocated resources are assigned to entities, such as individual persons, based on a role assigned to the entity and which of the four reference architecture pattern tiers or could infrastructure accounts is being utilized within exemplary reference architecture pattern N.

Consequently, as seen in FIG. 1, and as discussed in more detail below, pattern N tier 1, or account PN1, includes pattern N tier 1 permissions by pattern N role 10 required to access representative pattern N tier 1 asset 11 and/or representative pattern N tier 1 virtual asset 12.

Likewise, as seen in FIG. 1, and as discussed in more detail below, pattern N tier 2, or account PN2, includes pattern N tier 2 permissions by pattern N role 20 required to access representative pattern N tier 2 asset 21 and/or representative pattern N tier 2 virtual asset 22.

Similarly, as seen in FIG. 1, and as discussed in more detail below, pattern N tier 3, or account PN3, includes pattern N tier 3 permissions by pattern N role 30 required to access representative pattern N tier 3 asset 31 and/or representative pattern N tier 3 virtual asset 32.

Likewise, as seen in FIG. 1, and as discussed in more detail below, pattern N tier 4, or account PN4, includes pattern N tier 4 permissions by pattern N role 40 required to access representative pattern N tier 4 asset 41 and/or representative pattern N tier 4 virtual asset 42.

In one embodiment, once one or more reference architecture patterns are defined, for each reference architecture pattern, reference architecture pattern tier data representing the reference architecture pattern tiers associated with that reference architecture pattern is generated and logically arranged in a reference architecture pattern-based management plan based on, and/or associated with, that reference architecture pattern.

FIG. 2, FIG. 3, and FIG. 4 are illustrative examples of relational diagrams for two, three, and four, tier reference architecture pattern-based permissions management plans, respectively, in accordance with one embodiment.

FIG. 2 shows one illustrative example of a two-tier reference architecture pattern-based permissions management plan 200, referred to in FIG. 2 as reference architecture pattern-based permissions management plan 1. As seen in FIG. 2, reference architecture pattern-based permissions management plan 1 includes a first reference architecture pattern tier, or cloud computing infrastructure account, shown in FIG. 2 as pattern 1 tier 1, or account P11, and a second reference architecture pattern tier, or cloud computing infrastructure account, shown in FIG. 2 as pattern 1 tier 2, or account P12.

FIG. 3 shows one illustrative example of a three-tier reference architecture pattern-based permissions management plan 300, referred to in FIG. 3 as reference architecture pattern-based permissions management plan 2. As seen in FIG. 3, reference architecture pattern-based permissions management plan 2 includes a first reference architecture pattern tier, or cloud computing infrastructure account, shown in FIG. 3 as pattern 2 tier 1, or account P21, a second reference architecture pattern tier, or cloud computing infrastructure account, shown in FIG. 3 as pattern 2 tier 2, or account P22, and a third reference architecture pattern tier, or cloud computing infrastructure account, shown in FIG. 3 as pattern 2 tier 3, or account P23.

FIG. 4 shows one illustrative example of a four-tier reference architecture pattern-based permissions management plan 400, referred to in FIG. 4 as reference architecture pattern-based permissions management plan 3. As seen in FIG. 4, reference architecture pattern-based permissions management plan 3 includes a first reference architecture pattern tier, or cloud computing infrastructure account, shown in FIG. 4 as pattern 3 tier 1, or account P31, a second reference architecture pattern tier, or cloud computing infrastructure account, shown in FIG. 4 as pattern 3 tier 2, or account P32, a third reference architecture pattern tier, or cloud computing infrastructure account, shown in FIG. 4 as pattern 3 tier 3, or account P33, and a fourth reference architecture pattern tier, or cloud computing infrastructure account, shown in FIG. 4 as pattern 3 tier 4, or account P34.

Those of skill in the art will readily recognize that, as stated above, in various embodiments, the reference architecture patterns can be defined and associated with application types, or classes, that are developed, deployed, and operated, utilizing any number of reference architecture tiers or computing infrastructure accounts, with each of the reference architecture tiers/computing infrastructure accounts being any one of numerous reference architecture tier/computing infrastructure account types.

Consequently, the specific illustrative examples of reference architecture pattern-based permissions management plans of FIG. 2, FIG. 3, and FIG. 4 are not limiting and, in various embodiments, a given reference architecture pattern, and resulting reference architecture pattern-based permissions management plan, is defined by the specific number of tiers/accounts, and the specific type of tiers/accounts, used to develop, deploy, and operate the type or class of applications associated with the reference architecture pattern. Consequently, in various embodiments, multiple reference architecture patterns associated with multiple classes, or types, of applications are defined, including those distinct from the specific illustrative examples of FIG. 2, FIG. 3, and FIG. 4.

In one embodiment, once one or more reference architecture patterns are defined, and for each reference architecture pattern, reference architecture pattern tier data representing the reference architecture pattern tiers associated with that reference architecture pattern is generated and logically arranged in a reference architecture pattern-based management plan based on, and/or associated with, that reference architecture pattern, one or more reference architecture pattern roles to be associated with entities, e.g. individual persons, taking part in the development, and/or deployment, and/or operation of applications associated with the reference architecture patterns are defined.

In one embodiment, the one or more reference architecture pattern roles are defined once and then the same reference architecture pattern roles are utilized with each reference architecture pattern, and the resulting reference architecture pattern-based permissions management plan.

In other embodiments, the one or more reference architecture pattern roles are separately defined each reference architecture pattern, and the resulting reference architecture pattern-based permissions management plan.

In various embodiments, the one or more reference architecture pattern roles correlate to roles assigned by an organization, such as a company, associated with a reference architecture pattern-based permissions plan to individual entities, such as individual employees charged with developing, deploying, and/or operating one or more applications provided by, and/or through, the organization.

Typically, in order to provide greater data security, control, and separation of duties, each reference architecture pattern role, and therefore the entities assigned each reference architecture pattern role, is provided a different set of permissions and operational access that is deemed necessary to perform the duties assigned to that role. In addition, as discussed below, the permissions and operational access associated with each role is ideally further tailored to the permissions and operational access needed by that role in a specific reference architecture pattern tier, and/or computing infrastructure account. In the prior art, this three way tailoring of permissions and operational access based on the reference architecture pattern, and the role assigned within the reference architecture pattern, and the reference architecture pattern tier being utilized, was not available, at least not in any reasonably efficient and consistent way.

In various embodiments, the one or more reference architecture pattern roles include, but are not limited to, one or more of a supervisory administrator, or SuperAdmin, role; an administrator, or Admin, role; a security role; an operator role; a developer role; a third-party role; a user role; read-only role; and/or any other role, or combination of roles, to be assigned to individual entities, as discussed herein, and/or as known in the art at the time of filing, and/or as developed/made available after the time of filing.

As noted above, in one embodiment, a given entity is assigned one of the reference architecture pattern roles. In one embodiment, the entity maintains the assigned reference architecture pattern role, regardless of which reference architecture pattern, and associated reference architecture pattern-based permission management plan, is being implemented and regardless of which reference architecture pattern tier, and/or cloud computing infrastructure account, is being accessed or utilized by the entity. However, the permissions granted to the entity are variable and assigned based on the reference architecture pattern role assigned to the entity, and the reference architecture pattern being applied, and the reference architecture pattern tier, or cloud computing infrastructure account, being utilized.

In one embodiment, once one or more reference architecture pattern roles are defined for each reference architecture pattern, and resulting architecture pattern-based management plan, reference architecture pattern role data representing the defined or identified reference architecture pattern roles is generated and logically included in the reference architecture pattern-based permissions management plan based-on, and/or associated with each reference architecture pattern.

As noted above, FIG. 2, FIG. 3, and FIG. 4 are illustrative examples of relational diagrams for two, three, and four, tier reference architecture pattern-based permissions management plans, respectively, in accordance with one embodiment.

As seen in FIG. 2, reference architecture pattern-based permissions management plan 1 includes reference architecture pattern-based permissions management plan 1 roles (P1) SuperAdmin; (P1) Security; (P1) Admin; (P1) Operator; (P1) Developer; (P1) $3^{rd}$ Party; (P1) User; and (P1) Read-Only. In this particular illustrative example, the "(P1)" qualifier in front of each of the reference architecture pattern-based permissions management plan 1 roles indicates that role could be specifically defined for reference architecture pattern-based permissions management plan 1. However, in the specific illustrative examples shown in FIG. 2, FIG. 3, and FIG. 4, each of the reference architecture pattern-based permissions management plans uses the same reference architecture pattern-based permissions management plan roles.

As seen in FIG. 3, reference architecture pattern-based permissions management plan 2 includes reference architecture pattern-based permissions management plan 2 roles (P2) SuperAdmin; (P2) Security; (P2) Admin; (P2) Operator; (P2) Developer; (P2) $3^{rd}$ Party; (P2) User; and (P2) Read-Only. As noted above, in this particular illustrative example, the "(P2)" qualifier in front of each of the reference architecture pattern-based permissions management plan 2 roles indicates that role could be specifically defined for reference architecture pattern-based permissions management plan 2, but that is not the case in this specific illustrative example.

As seen in FIG. 4, reference architecture pattern-based permissions management plan 3 includes reference architecture pattern-based permissions management plan 3 roles (P3) SuperAdmin; (P3) Security; (P3) Admin; (P3) Operator; (P3) Developer; (P3) $3^{rd}$ Party; (P3) User; and (P3) Read-Only. As noted above, in this particular illustrative example, the "(P3)" qualifier in front of each of the reference architecture pattern-based permissions management plan 3 roles indicates that role could be specifically defined for reference architecture pattern-based permissions management plan 3, but that is not the case in this specific illustrative example.

Those of skill in the art will readily recognize that more or fewer reference architecture pattern roles, and/or numerous other reference architecture pattern roles, other than those shown in FIG. 2, FIG. 3, and FIG. 4, can be defined in various embodiments.

In one embodiment, for each reference architecture pattern, and associated reference architecture pattern-based permissions management plan, and for each reference architecture pattern role represented by the reference architecture pattern role data in the associated reference architecture pattern-based permissions management plan, at least one access and/or operational permission is associated with each reference architecture pattern tier represented in the reference architecture pattern tier data of the associated reference architecture pattern-based permissions management plan.

In various embodiments, one or more of the at least one access and/or operational permissions are actually permissions sets including one or more individual permissions and/or operational access, and/or functionality, to resources associated with the reference architecture pattern tiers and reference architecture pattern roles of the reference architecture pattern-based permissions management plan.

As specific illustrative examples, the at least one access and/or operational permissions, and/or permissions and/or operational access sets, include but are not limited to, one or more of, a super broad permissions set providing broad supervisory permissions, and/or operational access, to the resources allocated to the applicable reference architecture pattern tier; a broad permissions set providing a relatively broad set of permissions, and/or relatively broad operational access, to the resources allocated to the applicable reference architecture pattern tier; a moderate permissions set providing a relatively moderate set of permissions, and/or relatively moderate operational access, to the resources allocated to the applicable reference architecture pattern tier; a narrow permissions set providing a relatively narrow set of permissions, and/or relatively narrow operational access, to the resources allocated to the applicable reference architecture pattern tier.

As specific illustrative examples, the at least one access and/or operational permissions, and/or permissions and/or operational access sets, include but are not limited to, one or more of, a forensic permissions set providing forensic level permissions, and/or forensic level operational access, to the resources allocated to the applicable reference architecture pattern tier; a broad forensic permissions set providing a relatively broad forensic level of permissions, and/or relatively broad forensic level operational access, to the resources allocated to the applicable reference architecture pattern tier; a moderate forensic permissions set providing a relatively moderate forensic level of permissions, and/or relatively moderate forensic level operational access, to the resources allocated to the applicable reference architecture pattern tier; a narrow forensic permissions set providing a relatively narrow forensic level of permissions, and/or relatively narrow forensic level operational access, to the resources allocated to the applicable reference architecture pattern tier.

As specific illustrative examples, the at least one access and/or operational permissions, and/or permissions and/or operational access sets, include but are not limited to, one or more of, an administrator permissions set providing an administrator level of permissions, and/or administrator operational access, to the resources allocated to the applicable reference architecture pattern tier; a broad administrator permissions set providing a relatively broad set of administrator permissions, and/or relatively broad administrator operational access, to the resources allocated to the applicable reference architecture pattern tier; a moderate administrator permissions set providing a relatively moderate set of administrator permissions, and/or relatively moderate administrator operational access, to the resources allocated to the applicable reference architecture pattern tier; a narrow administrator permissions set providing a relatively narrow set of administrator permissions, and/or relatively narrow administrator operational access, to the resources allocated to the applicable reference architecture pattern tier.

As specific illustrative examples, the at least one access and/or operational permissions, and/or permissions and/or operational access sets, include but are not limited to, one or more of, an integrator permissions set providing integrator level of permissions, and/or integrator operational access, to the resources allocated to the applicable reference architecture pattern tier; a broad integrator permissions set providing a relatively broad set of integrator permissions, and/or relatively broad integrator operational access, to the resources allocated to the applicable reference architecture pattern tier; a moderate integrator permissions set providing a relatively moderate set of integrator permissions, and/or relatively moderate integrator operational access, to the resources allocated to the applicable reference architecture pattern tier; a narrow integrator permissions set providing a relatively narrow set of integrator permissions, and/or relatively narrow integrator operational access, to the resources allocated to the applicable reference architecture pattern tier.

As specific illustrative examples, the at least one access and/or operational permissions, and/or permissions and/or operational access sets, include but are not limited to, one or more of, an end-user permissions set providing end-user level of permissions, and/or end-user operational access, to the resources allocated to the applicable reference architecture pattern tier; a broad end-user permissions set providing a relatively broad set of end-user permissions, and/or relatively broad end-user operational access, to the resources allocated to the applicable reference architecture pattern tier; a moderate end-user permissions set providing a relatively moderate set of end-user permissions, and/or relatively moderate end-user operational access, to the resources allocated to the applicable reference architecture pattern tier; a narrow end-user permissions set providing a relatively narrow set of end-user permissions, and/or relatively narrow end-user operational access, to the resources allocated to the applicable reference architecture pattern tier.

As specific illustrative examples, the at least one access and/or operational permissions, and/or permissions and/or operational access sets, include but are not limited to, one or more of, a read-only permissions set providing read-only permissions, and/or read-only operational access, to the resources allocated to the applicable reference architecture pattern tier; a broad read-only permissions set providing a relatively broad set of read-only permissions, and/or relatively broad read-only operational access, to the resources allocated to the applicable reference architecture pattern tier; a moderate read-only permissions set providing a relatively moderate set of read-only permissions, and/or relatively moderate read-only operational access, to the resources allocated to the applicable reference architecture pattern tier; a narrow read-only permissions set providing a relatively narrow set of read-only permissions, and/or relatively narrow read-only operational access, to the resources allocated to the applicable reference architecture pattern tier.

Referring back to FIG. 2, reference architecture pattern-based permissions management plan 1 includes the permissions and/or operational access sets super-broad permissions, broad permissions, moderate permissions, narrow permissions, forensic permissions, admin permissions, integrator permissions, broad end-user permissions, end-user permissions, narrow end-user permissions, read-only permissions, and narrow read-only permissions, associated with specific reference architecture pattern-based permissions management plan 1 roles and specific reference architecture pattern-based permissions management plan 1 tiers, and/or accounts.

Referring to FIG. 3, reference architecture pattern-based permissions management plan 2 includes the permissions and/or operational access sets super-broad permissions, broad permissions, moderate permissions, narrow permissions, forensic permissions, admin permissions, integrator permissions, broad end-user permissions, end-user permissions, narrow end-user permissions, read-only permissions, broad read-only permissions, moderate read-only permissions, narrow read-only permissions, operator permissions, and application permissions associated with specific reference architecture pattern-based permissions management plan 2 roles and specific reference architecture pattern-based permissions management plan 2 tiers, and/or accounts.

Referring to FIG. 4, reference architecture pattern-based permissions management plan 3 includes the permissions and/or operational access sets super-broad permissions, broad permissions, moderate permissions, narrow permissions, forensic permissions, admin permissions, integrator permissions, broad end-user permissions, end-user permissions, narrow end-user permissions, read-only permissions, broad read-only permissions, moderate read-only permissions, narrow read-only permissions, operator permissions, and application permissions associated with specific reference architecture pattern-based permissions management plan 3 roles and specific reference architecture pattern-based permissions management plan 3 tiers, and/or accounts.

Those of skill in the art will readily recognize that numerous individual permissions and operational access data, and/or sets of permissions and/or operational access data can be defined in various embodiments. Consequently, the specific illustrative examples of FIG. 2, FIG. 3, and FIG. 4 are not limiting and that any permissions and/or operational access data, or combination of permissions and/or operational access data, as discussed herein, and/or as known in the art at the time of filing, and/or as made known after the time of filing, can be defined and provided.

In addition, in various embodiments, the individual permissions and operator access included in each set of permissions are different and assigned/defined by one or more entities creating the reference architecture pattern-based permissions management plan and/or developing, deploying, and/or operating the application.

In one embodiment, for each reference architecture pattern, and associated reference architecture pattern-based permissions plan, at least one entity is assigned one of the reference architecture pattern roles represented by the reference architecture pattern role data.

In one embodiment, for each reference architecture pattern, each reference architecture pattern-based permissions plan is used to automatically assign the appropriate permissions and operational access to each reference architecture pattern role represented by the reference architecture pattern role data in the reference architecture pattern-based permissions management plan based on the specific reference architecture pattern tier, or cloud computing infrastructure account, represented in the reference architecture pattern tier data.

Consequently, in one embodiment, an individual entity is assigned a specific reference architecture pattern role. Then, using the appropriate reference architecture pattern-based permissions plan, the appropriate permissions and operational access is automatically provided to that entity based on the specific reference architecture pattern role assigned to that entity, and the reference architecture pattern associated with the reference architecture pattern-based permissions plan, and the specific reference architecture pattern tier, or cloud computing infrastructure account, of the reference architecture pattern that the entity is attempting to access and/or utilize.

Referring to FIG. 2, it can be seen that using reference architecture pattern-based permissions management plan 1, an entity assigned the role of (P1) SuperAdmin is automatically provided broad permissions when utilizing or accessing pattern 1 tier 1/account P11 and Super-broad permissions when utilizing or accessing pattern 1 tier 2/account P12.

Similarly, using reference architecture pattern-based permissions management plan 1, an entity assigned the role of (P1) Security is automatically provided forensic permissions when utilizing or accessing pattern 1 tier 1/account P11 and forensic permissions when utilizing or accessing pattern 1 tier 2/account P12.

Similarly, using reference architecture pattern-based permissions management plan 1, an entity assigned the role of (P1) Admin is automatically provided broad permissions when utilizing or accessing pattern 1 tier 1/account P11 and moderate permissions when utilizing or accessing pattern 1 tier 2/account P12.

Similarly, using reference architecture pattern-based permissions management plan 1, an entity assigned the role of (P1) Operator is automatically provided narrow permissions when utilizing or accessing pattern 1 tier 1/account P11 and moderate permissions when utilizing or accessing pattern 1 tier 2/account P12.

Similarly, using reference architecture pattern-based permissions management plan 1, an entity assigned the role of (P1) Developer is automatically provided admin permissions when utilizing or accessing pattern 1 tier 1/account P11 and integrator permissions when utilizing or accessing pattern 1 tier 2/account P12.

Similarly, using reference architecture pattern-based permissions management plan 1, an entity assigned the role of (P1) $3^{rd}$ Party is automatically provided integrator permissions when utilizing or accessing pattern 1 tier 1/account P11 and broad end-user permissions when utilizing or accessing pattern 1 tier 2/account P12.

Similarly, using reference architecture pattern-based permissions management plan 1, an entity assigned the role of (P1) User is automatically provided end-user permissions when utilizing or accessing pattern 1 tier 1/account P11 and narrow end-user permissions when utilizing or accessing pattern 1 tier 2/account P12.

Similarly, using reference architecture pattern-based permissions management plan 1, an entity assigned the role of (P1) Read-Only is automatically provided read-only permissions when utilizing or accessing pattern 1 tier 1/account P11 and narrow read-only permissions when utilizing or accessing pattern 1 tier 2/account P12.

Referring to FIG. 3, it can be seen that using reference architecture pattern-based permissions management plan 2, an entity assigned the role of (P2) SuperAdmin is automatically provided super broad permissions when utilizing or accessing pattern 2 tier 1/account P21, broad permissions when utilizing or accessing pattern 2 tier 2/account P22, and moderate permissions when utilizing or accessing pattern 2 tier 3/account P23.

Similarly, using reference architecture pattern-based permissions management plan 2, an entity assigned the role of (P2) Security is automatically provided forensic permissions when utilizing or accessing pattern 2 tier 1/account P21, broad permissions when utilizing or accessing pattern 2 tier 2/account P22, and moderate permissions when utilizing or accessing pattern 2 tier 3/account P23.

Similarly, using reference architecture pattern-based permissions management plan 2, an entity assigned the role of (P2) Admin is automatically provided broad permissions when utilizing or accessing pattern 2 tier 1/account P21, moderate permissions when utilizing or accessing pattern 2 tier 2/account P22, and operator permissions when utilizing or accessing pattern 2 tier 3/account P23.

Similarly, using reference architecture pattern-based permissions management plan 2, an entity assigned the role of (P2) Operator is automatically provided narrow permissions when utilizing or accessing pattern 2 tier 1/account P21, moderate permissions when utilizing or accessing pattern 2 tier 2/account P22, and operator permissions when utilizing or accessing pattern 2 tier 3/account P23.

Similarly, using reference architecture pattern-based permissions management plan 2, an entity assigned the role of (P2) Developer is automatically provided admin permissions when utilizing or accessing pattern 2 tier 1/account P21, integrator permissions when utilizing or accessing pattern 2 tier 2/account P22, and narrow permissions when utilizing or accessing pattern 2 tier 3/account P23.

Similarly, using reference architecture pattern-based permissions management plan 2, an entity assigned the role of (P2) $3^{rd}$ Party is automatically provided integrator permissions when utilizing or accessing pattern 2 tier 1/account P21, broad end-user permissions when utilizing or accessing pattern 2 tier 2/account P22, and application permissions when utilizing or accessing pattern 2 tier 3/account P23.

Similarly, using reference architecture pattern-based permissions management plan 2, an entity assigned the role of (P2) User is automatically provided broad end-user permissions when utilizing or accessing pattern 2 tier 1/account P21, narrow end-user permissions when utilizing or accessing pattern 2 tier 2/account P22, and narrow read-only permissions when utilizing or accessing pattern 2 tier 3/account P23.

Similarly, using reference architecture pattern-based permissions management plan 2, an entity assigned the role of (P2) Read-Only is automatically provided broad read-only permissions when utilizing or accessing pattern 2 tier 1/account P21, moderate read-only permissions when utilizing or accessing pattern 2 tier 2/account P22, and narrow read-only permissions when utilizing or accessing pattern 2 tier 3/account P23.

Referring to FIG. 4, it can be seen that using reference architecture pattern-based permissions management plan 3, an entity assigned the role of (P3) SuperAdmin is automatically provided broad permissions when utilizing or accessing pattern 3 tier 1/account P31, super-broad permissions when utilizing or accessing pattern 3 tier 2/account P32, admin permissions when utilizing or accessing pattern 3 tier 3/account P33, and narrow permissions when utilizing or accessing pattern 3 tier 4/account P34.

Similarly, using reference architecture pattern-based permissions management plan 3, an entity assigned the role of (P3) Security is automatically provided forensic permissions when utilizing or accessing pattern 3 tier 1/account P31, forensic permissions when utilizing or accessing pattern 3 tier 2/account P32, broad permissions when utilizing or accessing pattern 3 tier 3/account P33, and admin permissions when utilizing or accessing pattern 3 tier 4/account P34.

Similarly, using reference architecture pattern-based permissions management plan 3, an entity assigned the role of (P3) Admin is automatically provided broad admin permissions when utilizing or accessing pattern 3 tier 1/account P31, narrow permissions when utilizing or accessing pattern 3 tier 2/account P32, moderate operator permissions when utilizing or accessing pattern 3 tier 3/account P33, and read-only permissions when utilizing or accessing pattern 3 tier 4/account P34.

Similarly, using reference architecture pattern-based permissions management plan 3, an entity assigned the role of (P3) Operator is automatically provided narrow operator permissions when utilizing or accessing pattern 3 tier 1/account P31, narrow permissions when utilizing or accessing pattern 3 tier 2/account P32, moderate operator permissions when utilizing or accessing pattern 3 tier 3/account P33, and end-user permissions when utilizing or accessing pattern 3 tier 4/account P34.

Similarly, using reference architecture pattern-based permissions management plan 3, an entity assigned the role of (P3) Developer is automatically provided super broad permissions when utilizing or accessing pattern 3 tier 1/account P31, broad permissions when utilizing or accessing pattern 3 tier 2/account P32, admin permissions when utilizing or accessing pattern 3 tier 3/account P33, and end-user permissions when utilizing or accessing pattern 3 tier 4/account P34.

Similarly, using reference architecture pattern-based permissions management plan 3, an entity assigned the role of (P3) $3^{rd}$ Party is automatically provided integrator permissions when utilizing or accessing pattern 3 tier 1/account P31, end-user permissions when utilizing or accessing pattern 3 tier 2/account P32, integrator permissions when utilizing or accessing pattern 3 tier 3/account P33, and end-user permissions when utilizing or accessing pattern 3 tier 4/account P34.

Similarly, using reference architecture pattern-based permissions management plan 3, an entity assigned the role of (P3) User is automatically provided narrow read-only permissions when utilizing or accessing pattern 3 tier 1/account P31, read-only permissions when utilizing or accessing pattern 3 tier 2/account P32, narrow end-user permissions when utilizing or accessing pattern 3 tier 3/account P33, and broad end-user permissions when utilizing or accessing pattern 3 tier 4/account P34.

Similarly, using reference architecture pattern-based permissions management plan 3, an entity assigned the role of (P3) Read-Only is automatically provided narrow read-only permissions when utilizing or accessing pattern 3 tier 1/account P31, moderate read-only permissions when utilizing or accessing pattern 3 tier 2/account P32, read-only permissions when utilizing or accessing pattern 3 tier 3/account P33, and broad read-only permissions when utilizing or accessing pattern 3 tier 4/account P34.

In one embodiment, once the reference architecture pattern-based permissions management plans associated with each desired reference architecture pattern are created, for each reference architecture pattern-based permissions management plan, pattern-based permissions management plan data is generated representing the reference architecture pattern-based permissions management plan. In one embodiment, the pattern-based permissions management plan data is then stored in a memory, database, or other data storage mechanism. As discussed below, in one embodiment, the pattern-based permissions management plan data is then provided to one or more processors, processing systems, and/or computing systems which then implement the reference architecture pattern-based permissions management plans represented by the pattern-based permissions management plan data.

Figure 5:
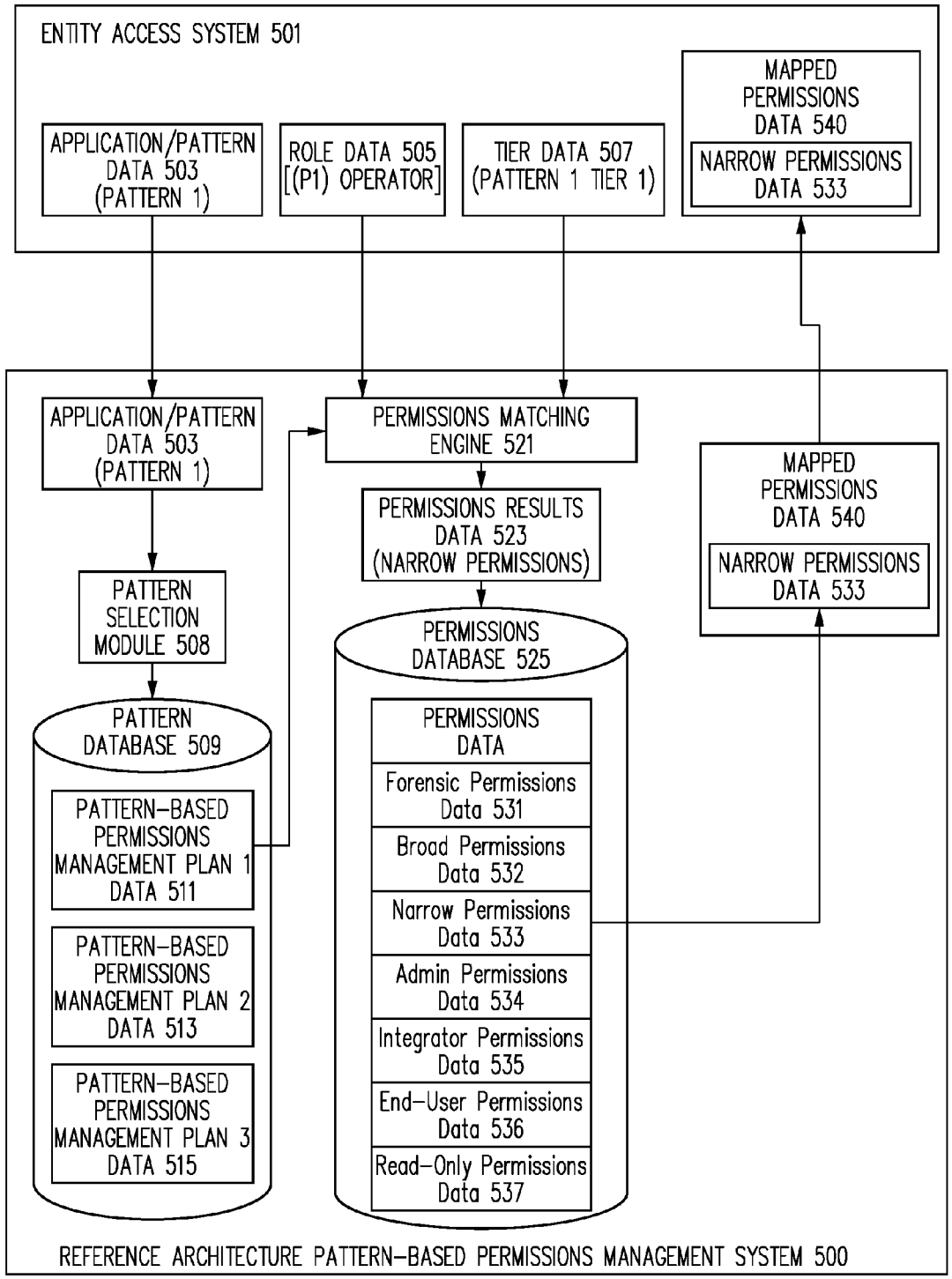
FIG. 5 is a functional block diagram showing the interaction of various components for implementing one embodiment.

FIG. 5 is functional diagram of the interaction of various elements associated with one embodiment of the methods and systems for providing reference architecture pattern-based permissions management discussed herein. Of particular note, the various elements in FIG. 5 are shown for illustrative purposes as being associated with specific computing systems and/or environments, such as entity access system 501 and reference architecture pattern-based permissions management system 500. However, the exemplary placement of the various elements within these environments and systems in FIG. 5 is made for illustrative purposes only and, in various embodiments, any individual element shown in FIG. 5, or combination of elements shown in FIG. 5, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 5, and/or the computing environments, systems, and architectural and/or infrastructure components, deploying the elements shown in FIG. 5, can be under the control of, or otherwise associated with, various parties or entities, or multiple parties or entities, such as, but not limited to, the owner of a data center, a party and/or entity providing all, or a portion, of a cloud-based computing environment, the owner or a provider of a service, the owner or provider of one or more resources, and/or any other party and/or entity providing one or more functions, and/or any other party and/or entity as discussed herein, and/or as known in the art at the time of filing, and/or as made known after the time of filing.

As seen in FIG. 5, in one illustrative example of one embodiment, an entity, such as a person charged with the development, deployment, and/or operation of an application or service, attempts to use an entity access system, such as entity access system 501 in FIG. 5, to perform one or more tasks.

As seen in FIG. 5, in one embodiment, application/pattern data 503 is included in entity access system 501 and includes data indicating the specific reference architecture pattern, and associated reference architecture pattern-based permissions management plan, that is associated with an application of service the entity is attempting to access and/or interact with. As also seen in FIG. 5, in this specific illustrative example, application/pattern data 503 includes data indicating that pattern 1, and associated reference architecture pattern-based permissions management plan 1 of FIG. 2, is applicable.

As seen in FIG. 5, in one embodiment, role data 505 is included in entity access system 501 and includes data representing the reference architecture pattern-based permissions management plan role assigned to the entity. As seen in FIG. 5, in this particular illustrative example, role data 505 indicates that the entity associated with entity access system 501 has been assigned the role of (P1) Operator, i.e., the role Operator in reference architecture pattern-based permissions management plan 1 of FIG. 2.

As seen in FIG. 5, entity access system 501 includes tier data 507. In one embodiment, tier data 507 includes data indicating the specific reference architecture pattern tier, and/or cloud computing infrastructure account, the entity associated with entity access system 501 is currently trying to access and/or utilize. As seen in FIG. 5, in this specific illustrative example, tier data 507 indicates that the entity associated with entity access system 501 is attempting to utilize or access pattern 1 tier 1, e.g., account 11, of reference architecture pattern-based permissions management plan 1 of FIG. 2.

As discussed above, in order for the entity associated with entity access system 501 to access the various resources associated with the desired reference architecture pattern tier/cloud computing infrastructure account, various permissions will have to be provided. In one embodiment, the permissions to be provided are determined based on analysis and processing performed by reference architecture pattern-based permissions management system 500.

As seen in FIG. 5, in one embodiment, application/pattern data 503 is provided to pattern selection module 508 of reference architecture pattern-based permissions management system 500. In one embodiment, pattern selection module 508 is used to determine which reference architecture pattern, and associated architecture pattern-based permissions management plan, is applicable to the application the entity associated with entity access system 501 is attempting to access.

In one embodiment, pattern-based permissions management data representing the various architecture pattern-based permissions management plans is stored in pattern database 509. As seen in FIG. 5, pattern database 509, in this specific illustrative example, includes pattern-based permissions management plan 1 data 511 representing architecture pattern-based permissions management plan 1 of FIG. 2; pattern-based permissions management plan 1 data 513 representing architecture pattern-based permissions management plan 2 of FIG. 3; and pattern-based permissions management plan 1 data 515 representing architecture pattern-based permissions management plan 3 of FIG. 4

Returning to FIG. 5, as noted above, in this specific illustrative example, application/pattern data 503 indicates that architecture pattern-based permissions management plan 1 of FIG. 2 is the applicable architecture pattern-based permissions management plan. Consequently, in this specific illustrative example, pattern selection module 508 selects pattern-based permissions management plan 1 data 511 from pattern database 509.

In one embodiment, once pattern selection module 508 receives application/pattern data 503 and selects the appropriate pattern-based permissions management plan data from pattern database 509, the selected appropriate pattern-based permissions management plan data is provided to permissions matching engine 521. In one embodiment, role data 505 and tier data 507 are also provided as inputs to permissions matching engine 521.

As noted above, in this specific illustrative example, pattern selection module 508 receives application/pattern data 503 indicating the appropriate pattern-based permissions management plan data is pattern-based permissions management plan 1 data 511. Consequently, pattern-based permissions management plan 1 data 511 is provided as one input to permissions matching engine 521. In addition, role data 505 indicating the role assigned to the entity of entity access system 501 is the role (P1) Operator, and tier data 507 indicating the reference architecture pattern 1 tier 1, e.g., cloud computing infrastructure account P11, are also provided as input to permissions matching engine 521.

In one embodiment, at permissions matching engine 521 role data 505 and tier data 507 are used within the context of the selected pattern-based permissions management plan 1 data 511 representing architecture pattern-based permissions management plan 1 of FIG. 2 to determine what permissions, functionality, and operational access are to be provided to the entity associated with entity access system 501. Permission results data 523 is then generated by permissions matching engine 521 identifying the determined permissions, functionality, and operational access sets to be provided to the entity associated with entity access system 501.

As noted above, in this specific illustrative example, the appropriate pattern-based permissions management plan data is pattern-based permissions management plan 1 data 511, role data 505 indicates the role assigned to the entity of entity access system 501 is the role (P1) Operator, and tier data 507 indicates the reference architecture pattern 1 tier 1, e.g., cloud computing infrastructure account P11. Consequently, referring to FIG. 2 and architecture pattern-based permissions management plan 1, it can be seen that the permission set associated with role (P1) Operator and reference architecture pattern 1 tier 1, within the context of architecture pattern-based permissions management plan 1 is the permission set "narrow permissions." Consequently, in this specific illustrative example, permissions results data 523 includes data indicating that the permission set to be provided to the entity associated with entity access system 501 is the permission set narrow permissions.

As seen in FIG. 5, in one embodiment, permissions database 525 is provided. In one embodiment, permissions database 525 includes data representing the various permissions, functionality, and operational access data associated with the defined reference architecture pattern roles, and reference architecture pattern tiers, and reference architecture patterns set forth in the pattern-based permissions management plan data of pattern database 509 representing the various architecture pattern-based permissions management plans.

In the specific illustrative example of FIG. 5, permissions database includes forensic permissions data 531, broad permissions data 532, narrow permissions data 533, admin permissions data 534, integrator permissions data 535; end-user permissions data 536, and read-only permissions data 537.

Returning to FIG. 5, in one embodiment, once permissions matching engine 521 generates permissions results data 523, permissions results data 523 is used to select data representing the permissions included in the permissions set indicated in permissions results data 523 from permissions database 525. In this specific illustrative example, the data representing the permissions included in the permissions set indicated in permissions results data 523 from permissions database 525 is represented by mapped permissions data 540.

As noted above, in this specific illustrative example, permissions results data 523 includes data indicating that the permission set to be provided to the entity associated with entity access system 501 is the permission set "narrow permissions". Consequently, in this specific illustrative example, permissions results data 523 is used to obtain narrow permissions data 533 from permissions database 525 and generate mapped permissions data 540 including narrow permissions data 533.

In one embodiment, once mapped permissions data 540 is generated including the appropriate permissions data representing the permissions and/or operational access included in the permission set indicated by permissions results data 523, mapped permissions data 540 is provided to entity access system 501; thereby providing the entity associated with entity access system 501 the permissions deemed necessary and appropriate in accordance with the reference architecture pattern role assigned to the entity, and the reference architecture pattern tier for which axis is desired, and within the context of the reference architecture pattern associated with the application currently being developed, deployed, and/or operated by the entity associated with entity access system 501.

As noted above, in this specific illustrative example, permissions results data 523 includes data indicating that the permission set to be provided to the entity associated with entity access system 501 is the permission set "narrow permissions". Consequently, in this specific illustrative example, permissions results data 523 is used to obtain narrow permissions data 533 from permissions database 525 and generate mapped permissions data 540 including narrow permissions data 533. Then, mapped permissions data 540 is provided to entity access system 501, thereby providing the entity associated with entity access system 501 the narrow permissions associated with the entities reference architecture pattern role of (P1) Operator and the referenced pattern architecture tier, pattern 1 tier 1 and within the context of architecture pattern-based permissions management plan 1 associated with the application being developed, deployed, and/or operated by the entity associated with entity access system 501.

Using the methods and systems for providing reference architecture pattern-based permissions management discussed herein, a given entity, such as a person, taking part in the various stages of the development, deployment, and operation of an application is provided permission, functionality, and operational access based on a role assigned to the entity, and the reference architecture pattern associated with the application, and the tier, e.g., the cloud computing infrastructure provider account, of the reference architecture pattern currently being accessed or used by the entity. Consequently, using the methods and systems for providing reference architecture pattern-based permissions management discussed herein, a single role assigned to an entity correlates to different permissions, functionality, and operational access depending on the reference architecture pattern and tier of the reference architecture pattern being accessed.

In addition, using the methods and systems for providing reference architecture pattern-based permissions management discussed herein, multiple reference architecture pattern-based permission management plans for various types, or classes, of applications are defined. Then these reference architecture pattern-based permission management plans are used for multiple applications of the same reference architecture pattern type and the permissions for a given entity can be automatically assigned and provided based on the reference architecture pattern in use, and the tier or account associated with the reference architecture pattern being utilized/accessed, and the role assigned to the entity within the reference architecture pattern.

Consequently, using the methods and systems for providing reference architecture pattern-based permissions management discussed herein, a permissions management system centered on reference architecture patterns, e.g., blueprints, cookbooks, and templates, for various types, or classes of applications is provided. Then these reference architecture pattern-based permission management systems are used for multiple applications of the same reference architecture pattern type and the permissions for a given entity can be automatically assigned and provided based on the reference architecture pattern in use, and the tier or account associated with the reference architecture pattern being utilized/accessed, and the role assigned to the entity within the reference architecture pattern.

Process

In accordance with one embodiment, a process for providing reference architecture pattern-based permissions management includes defining one or more reference architecture patterns for the development, and/or deployment, and/or operation of an application, or application type.

In one embodiment, one or more reference architecture pattern roles to be associated with entities taking part in the development, and/or deployment, and/or operation of an application using a reference architecture pattern are identified. In one embodiment, reference architecture pattern role data representing the identified reference architecture pattern roles is generated.

In one embodiment, for each reference architecture pattern, reference architecture pattern tiers used to create, and/or deploy, and/or operate an application using the reference architecture pattern are identified. In one embodiment, reference architecture pattern tier data representing the reference architecture pattern tiers is generated.

In one embodiment, for each reference architecture pattern, and for each reference architecture pattern role represented by the reference architecture pattern role data, at least one access and/or operational permission is associated with each reference architecture pattern tier represented in the reference architecture pattern tier data.

In one embodiment, for each reference architecture pattern, at least one entity is assigned one of the reference architecture pattern roles represented by the reference architecture pattern role data and, for each reference architecture pattern tier represented in the reference architecture pattern tier data, the at least one entity is automatically provided the at least one access and/or operational permission associated with the reference architecture pattern role assigned to the entity.

Figure 6:
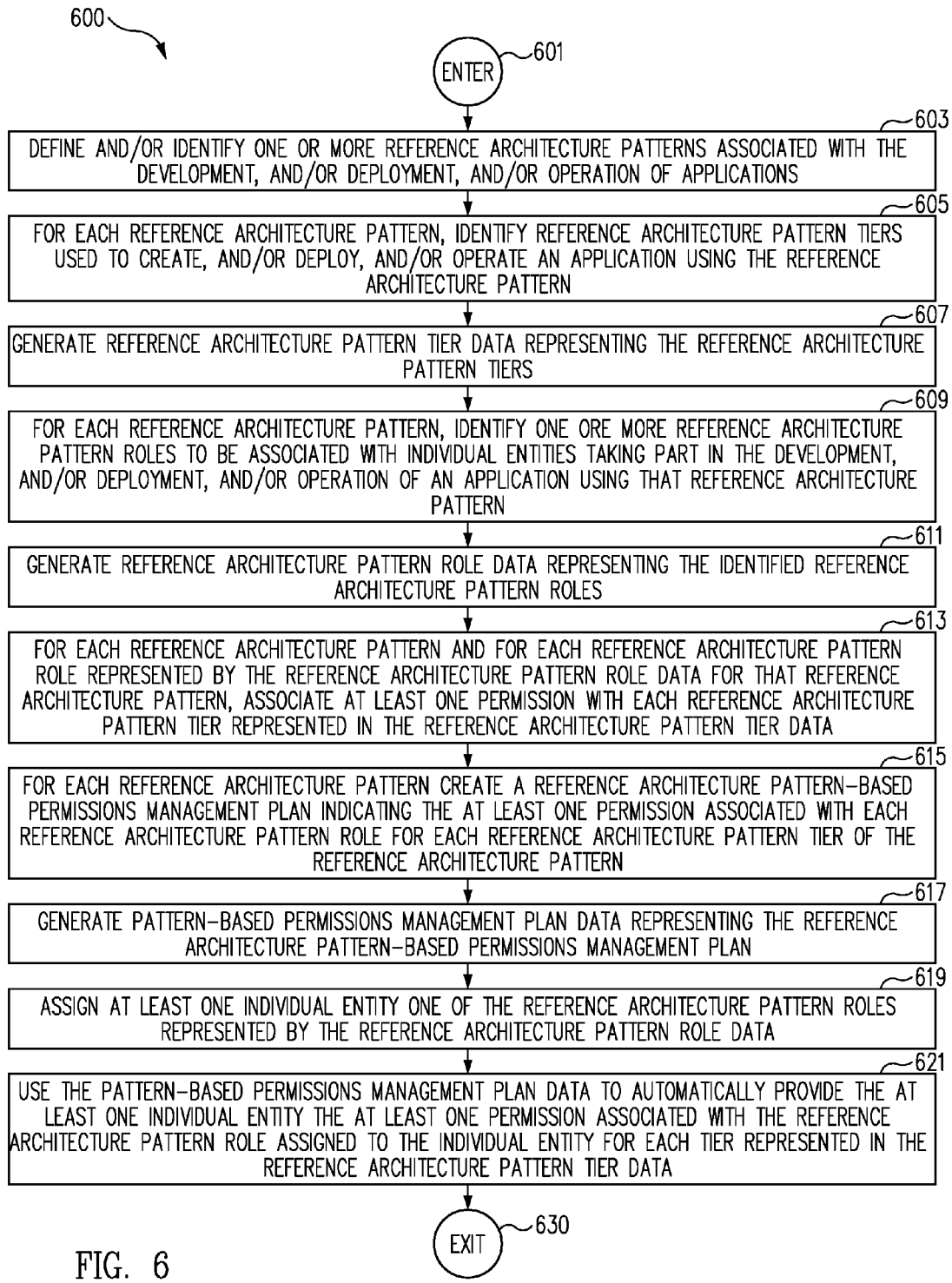
FIG. 6 is a flow chart depicting a process for providing reference architecture pattern-based permissions management in accordance with one embodiment.

FIG. 6 is a flow chart of a process 600 for providing reference architecture pattern-based permissions management in accordance with one embodiment.

In one embodiment, process 600 for providing reference architecture pattern-based permissions management begins at ENTER OPERATION 601 of FIG. 6 and process flow proceeds to DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603.

In one embodiment, at DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 one or more reference architecture patterns to be used in connection with the development, and/or deployment, and/or operation of an application or application type are identified and/or defined.

In one embodiment, the reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 represent the "blueprints" or "recipes" indicating the usage and interconnection of steps, stages, accounts, and/or tiers used to develop, deploy, and/or operate a class, or type, of application associated with each of the reference architecture patterns.

In various embodiments, each of the different types of reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 is associated with a type, or class, of applications where the same number of tiers, and types of tiers, are utilized and interconnected to develop, deploy, and/or operate the applications.

As a specific illustrative example, in one embodiment, a specific reference architecture pattern may be defined and associated with two tier applications where the two tiers used to develop, deploy, and/or operate the applications are a development tier and a production tier.

As another illustrative example, in one embodiment, a specific reference architecture pattern may be defined and associated with three tier applications where the three tiers include a development tier, a pre-production tier, and a production tier.

As another illustrative example, in one embodiment, a specific reference architecture pattern may be defined and associated with three-tier applications were the three tiers include a development tier, a production tier, and a web tier.

As another illustrative example, in one embodiment, a specific reference architecture pattern may be defined and associated with four tier applications were the four tiers include a development tier, a pre-production tier, a production tier, and a staging tier.

As can be seen from the specific illustrative examples above, in various embodiments, the reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 can be defined and associated with application types, or classes, that are developed, deployed, and operated, utilizing any number of tiers, with each of the tiers being any one of numerous tier types.

Consequently, in various embodiments, multiple reference architecture patterns associated with multiple classes, or types, of applications are identified and/or defined at DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603.

In one embodiment, once one or more reference architecture patterns to be used in connection with the development, and/or deployment, and/or operation of an application or application type are identified and/or defined at DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603, process flow proceeds to FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605.

In one embodiment, at FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 reference architecture pattern tiers associated with each of the reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 are identified and/or defined.

In various embodiments, the reference architecture pattern tiers associated with the reference architecture patterns of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 represent various stages or functionality used to develop, deploy, and/or operate the applications.

In various embodiments, the tiers associated with the reference architecture patterns of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 include, but are not limited to, one or more of a development tier; a pre-production tier; a production tier; a staging tier; an integration tier; an external tier; a security tier; and/or any other tier representing a stage or functional operability associated with the development, deployment, or operation of an application, and/or class of applications.

In various embodiments, and particularly those where the applications are to be deployed and operated in a cloud computing infrastructure, each of the reference architecture pattern tiers of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 is, or is associated with, a separate cloud computing infrastructure account provided through the cloud computing infrastructure provider. Consequently, in various embodiments, the reference architecture pattern tiers associated with the reference architecture patterns of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 include, but are not limited to, one or more of a development account; a pre-production account; a production account; a staging account; an integration account; an external account; a security account, and/or any other cloud computing infrastructure account associated with a stage or functional operability in the development, deployment, or operation of an application, and/or class of applications.

In various embodiments, each of the reference architecture pattern tiers or cloud computing infrastructure accounts of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 has associated resources allocated to it that are used to implement the functionality associated with each of the reference architecture pattern tiers or cloud computing infrastructure accounts of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605.

In various embodiments, the resources allocated to the reference architecture pattern tiers of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 include, but are not limited to, any of the assets, virtual assets, and/or other production environment components discussed herein, and/or defined above, and/or as known in the art at the time of filing, and/or as developed after the time of filing.

In one embodiment, once reference architecture pattern tiers associated with each of the reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 are identified and/or defined at FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605, process flow proceeds to GENERATE REFERENCE ARCHITECTURE PATTERN TIER DATA REPRESENTING THE REFERENCE ARCHITECTURE PATTERN TIERS OPERATION 607.

In one embodiment, at GENERATE REFERENCE ARCHITECTURE PATTERN TIER DATA REPRESENTING THE REFERENCE ARCHITECTURE PATTERN TIERS OPERATION 607 reference architecture pattern tier data representing the reference architecture pattern tiers of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 associated with each reference architecture pattern of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 is generated.

As discussed below, in one embodiment the reference architecture pattern tier data of GENERATE REFERENCE ARCHITECTURE PATTERN TIER DATA REPRESENTING THE REFERENCE ARCHITECTURE PATTERN TIERS OPERATION 607 is to be logically arranged in reference architecture pattern-based management plans based on, and/or associated with, the reference architecture patterns.

In one embodiment, once reference architecture pattern tier data representing the reference architecture pattern tiers associated with each reference architecture pattern is generated at GENERATE REFERENCE ARCHITECTURE PATTERN TIER DATA REPRESENTING THE REFERENCE ARCHITECTURE PATTERN TIERS OPERATION 607, process flow proceeds to FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609.

In one embodiment, at FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609 one or more reference architecture pattern roles to be associated with entities, e.g. individual persons, taking part in the development, and/or deployment, and/or operation of applications associated with each of the reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 are defined.

In one embodiment, the one or more reference architecture pattern roles are defined once at FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609 and then the same reference architecture pattern roles are utilized with each reference architecture pattern of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603, and the resulting reference architecture pattern-based permissions management plans discussed below.

In other embodiments, the one or more reference architecture pattern roles are separately defined at FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609 for each reference architecture pattern of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 and the resulting reference architecture pattern-based permissions management plans discussed below.

In various embodiments, the one or more reference architecture pattern roles of FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609 correlate to roles assigned by an organization, such as a company, associated with a reference architecture pattern-based permissions plan to individual entities, such as individual employees, charged with developing, deploying, and/or operating one or more applications provided by, and/or through, the organization.

Typically, in order to provide greater data security, control, and separation of duties, each reference architecture pattern role of FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609, and therefore the entities assigned each reference architecture pattern role, is provided a different set of permissions and operational access that is deemed necessary to perform the duties assigned to that role. In addition, as discussed below, the permissions and operational access associated with each reference architecture pattern role is ideally further tailored to the permissions and operational access needed by that reference architecture pattern role in a specific reference architecture pattern tier, and/or computing infrastructure account. In the prior art, this three way tailoring of permissions and operational access based on the reference architecture pattern, the role assigned within the reference architecture pattern, and the reference architecture pattern tier being utilized, was not available, at least not in any reasonably efficient and consistent way.

In various embodiments, the one or more reference architecture pattern roles of FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609 include, but are not limited to, one or more of a supervisory administrator, or SuperAdmin, role; an administrator, or Admin, role; a security role; an operator role; a developer role; a third-party role; a user role; read-only role; and/or any other role, or combination of roles, to be assigned to individual entities, as discussed herein, and/or as known in the art at the time of filing, and/or as developed/made available after the time of filing.

As discussed below, in one embodiment, a given entity is assigned one of the reference architecture pattern roles of FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609. In one embodiment, the entity maintains the assigned reference architecture pattern role, regardless of which reference architecture pattern, and associated reference architecture pattern-based permission management plan, is being implemented and regardless of which reference architecture pattern tier, and/or cloud computing infrastructure account, is being accessed or utilized by the entity. However, the permissions granted to the entity are variable and assigned based on the reference architecture pattern role assigned to the entity, and the reference architecture pattern being applied, and the reference architecture pattern tier, or cloud computing infrastructure account, being utilized.

In one embodiment, once one or more reference architecture pattern roles to be associated with entities, e.g. individual persons, taking part in the development, and/or deployment, and/or operation of applications associated with each of the reference architecture patterns are defined at FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609, process flow proceeds to GENERATE REFERENCE ARCHITECTURE PATTERN ROLE DATA REPRESENTING THE IDENTIFIED REFERENCE ARCHITECTURE PATTERN ROLES OPERATION 611.

In one embodiment, at GENERATE REFERENCE ARCHITECTURE PATTERN ROLE DATA REPRESENTING THE IDENTIFIED REFERENCE ARCHITECTURE PATTERN ROLES OPERATION 611 reference architecture pattern role data representing the defined or identified reference architecture pattern roles of FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609 is generated.

As discussed below, in one embodiment, the reference architecture pattern role data of GENERATE REFERENCE ARCHITECTURE PATTERN ROLE DATA REPRESENTING THE IDENTIFIED REFERENCE ARCHITECTURE PATTERN ROLES OPERATION 611 will be logically included in the reference architecture pattern-based permissions management plans based-on, and/or associated with, each reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603.

In one embodiment, once reference architecture pattern role data representing the defined or identified reference architecture pattern roles is generated at GENERATE REFERENCE ARCHITECTURE PATTERN ROLE DATA REPRESENTING THE IDENTIFIED REFERENCE ARCHITECTURE PATTERN ROLES OPERATION 611, process flow proceeds to FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613.

In one embodiment, at FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613 for each reference architecture pattern of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603, and for each reference architecture pattern role represented by the reference architecture pattern role data of GENERATE REFERENCE ARCHITECTURE PATTERN ROLE DATA REPRESENTING THE IDENTIFIED REFERENCE ARCHITECTURE PATTERN ROLES OPERATION 611, at least one access and/or operational permission is associated with each reference architecture pattern tier represented in the reference architecture pattern tier data of GENERATE REFERENCE ARCHITECTURE PATTERN TIER DATA REPRESENTING THE REFERENCE ARCHITECTURE PATTERN TIERS OPERATION 607.

In various embodiments, the at least one access and/or operational permissions of FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613 are actually permissions sets including one or more individual permissions and/or operational access to resources associated with the reference architecture pattern tiers and reference architecture pattern roles of the reference architecture patterns.

As specific illustrative examples, the at least one access and/or operational permissions, and/or permissions and/or operational access sets, of FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613 include but are not limited to, any of the at least one access and/or operational permissions, and/or permissions and/or operational access sets discussed herein, and/or as known at the time of filing, and/or as developed after the time of filing.

In addition, in various embodiments, the individual permissions and operator access included in each set of permissions of FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613 are different and assigned/defined by one or more entities creating the reference architecture pattern-based permissions management plan and/or developing, deploying, and/or operating the application.

In one embodiment, once for each reference architecture pattern, and associated reference architecture pattern-based permissions management plan, and for each reference architecture pattern role represented by the reference architecture pattern role data in the associated reference architecture pattern-based permissions management plan, at least one access and/or operational permission is associated with each reference architecture pattern tier represented in the reference architecture pattern tier data of the associated reference architecture pattern-based permissions management plan at FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613, process flow proceeds to FOR EACH REFERENCE ARCHITECTURE PATTERN CREATE A REFERENCE ARCHITECTURE PATTERN-BASED PERMISSIONS MANAGEMENT PLAN INDICATING THE AT LEAST ONE PERMISSION ASSOCIATED WITH EACH REFERENCE ARCHITECTURE PATTERN ROLE FOR EACH REFERENCE ARCHITECTURE PATTERN TIER OF THE REFERENCE ARCHITECTURE PATTERN OPERATION 615.

In one embodiment, at FOR EACH REFERENCE ARCHITECTURE PATTERN CREATE A REFERENCE ARCHITECTURE PATTERN-BASED PERMISSIONS MANAGEMENT PLAN INDICATING THE AT LEAST ONE PERMISSION ASSOCIATED WITH EACH REFERENCE ARCHITECTURE PATTERN ROLE FOR EACH REFERENCE ARCHITECTURE PATTERN TIER OF THE REFERENCE ARCHITECTURE PATTERN OPERATION 615 the reference architecture pattern tier data representing the reference architecture pattern tiers of FOR EACH REFERENCE ARCHITECTURE PATTERN, IDENTIFY REFERENCE ARCHITECTURE PATTERN TIERS USED TO CREATE, AND/OR DEPLOY, AND/OR OPERATE AN APPLICATION USING THE REFERENCE ARCHITECTURE PATTERN OPERATION 605 associated with each reference architecture pattern of DEFINE AND/OR IDEN- TIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603 of GENERATE REFERENCE ARCHITECTURE PATTERN TIER DATA REPRESENTING THE REFERENCE ARCHITECTURE PATTERN TIERS OPERATION 607; the reference architecture pattern role data representing the defined or identified reference architecture pattern roles of FOR EACH REFERENCE ARCHITECTURE PATTERN, IDENTIFY ONE OR MORE REFERENCE ARCHITECTURE PATTERN ROLES TO BE ASSOCIATED WITH INDIVIDUAL ENTITIES TAKING PART IN THE DEVELOPMENT, AND/OR DEPLOYMENT, AND/OR OPERATION OF AN APPLICATION USING THAT REFERENCE ARCHITECTURE PATTERN OPERATION 609 of GENERATE REFERENCE ARCHITECTURE PATTERN ROLE DATA REPRESENTING THE IDENTIFIED REFERENCE ARCHITECTURE PATTERN ROLES OPERATION 611; and data representing the at least one access and/or operational permissions of FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613 is used to create a reference architecture pattern-based permissions management plan for each of the reference architecture patterns of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603.

As discussed in detail above with respect to FIG. 2, FIG. 3, FIG. 4, and FIG. 5, the reference architecture pattern-based permissions management plans created at FOR EACH REFERENCE ARCHITECTURE PATTERN CREATE A REFERENCE ARCHITECTURE PATTERN-BASED PERMISSIONS MANAGEMENT PLAN INDICATING THE AT LEAST ONE PERMISSION ASSOCIATED WITH EACH REFERENCE ARCHITECTURE PATTERN ROLE FOR EACH REFERENCE ARCHITECTURE PATTERN TIER OF THE REFERENCE ARCHITECTURE PATTERN OPERATION 615 correlate each reference architecture pattern role with a different set of permissions and operational access that is deemed necessary to perform the duties assigned to that role. In addition, in each the reference architecture pattern-based permissions management plan, the permissions and operational access associated with each reference architecture pattern role is further tailored to the permissions and operational access needed by that reference architecture pattern role in a specific reference architecture pattern tier, and/or computing infrastructure account. In the prior art, this three way tailoring of permissions and operational access based on the reference architecture pattern, and the role assigned within the reference architecture pattern, and the reference architecture pattern tier being utilized, was not available, at least not in any reasonably efficient and consistent way.

In one embodiment, once the reference architecture pattern tier data representing the reference architecture pattern tiers associated with each reference architecture pattern; the reference architecture pattern role data representing the defined or identified reference architecture pattern roles; and data representing the at least one access and/or operational permissions is used to create a reference architecture pattern-based permissions management plan for each of the reference architecture patterns at FOR EACH REFERENCE ARCHITECTURE PATTERN CREATE A REFERENCE ARCHITECTURE PATTERN-BASED PERMISSIONS MANAGEMENT PLAN INDICATING THE AT LEAST ONE PERMISSION ASSOCIATED WITH EACH REFERENCE ARCHITECTURE PATTERN ROLE FOR EACH REFERENCE ARCHITECTURE PATTERN TIER OF THE REFERENCE ARCHITECTURE PATTERN OPERATION 615, process flow proceeds to GENERATE PATTERN-BASED PERMISSIONS MANAGEMENT PLAN DATA REPRESENTING THE REFERENCE ARCHITECTURE PATTERN-BASED PERMISSIONS MANAGEMENT PLAN OPERATION 617.

In one embodiment, at GENERATE PATTERN-BASED PERMISSIONS MANAGEMENT PLAN DATA REPRESENTING THE REFERENCE ARCHITECTURE PATTERN-BASED PERMISSIONS MANAGEMENT PLAN OPERATION 617 pattern-based permissions management plan data representing each of the reference architecture pattern-based permissions management plans of FOR EACH REFERENCE ARCHITECTURE PATTERN CREATE A REFERENCE ARCHITECTURE PATTERN-BASED PERMISSIONS MANAGEMENT PLAN INDICATING THE AT LEAST ONE PERMISSION ASSOCIATED WITH EACH REFERENCE ARCHITECTURE PATTERN ROLE FOR EACH REFERENCE ARCHITECTURE PATTERN TIER OF THE REFERENCE ARCHITECTURE PATTERN OPERATION 615 is generated.

In one embodiment, once the reference architecture pattern-based permissions management plans associated with each desired reference architecture pattern are created for each reference architecture pattern-based permissions management plan, pattern-based permissions management plan data is generated at GENERATE PATTERN-BASED PERMISSIONS MANAGEMENT PLAN DATA REPRESENTING THE REFERENCE ARCHITECTURE PATTERN-BASED PERMISSIONS MANAGEMENT PLAN OPERATION 617 representing the reference architecture pattern-based permissions management plan.

In one embodiment, the pattern-based permissions management plan data of GENERATE PATTERN-BASED PERMISSIONS MANAGEMENT PLAN DATA REPRESENTING THE REFERENCE ARCHITECTURE PATTERN-BASED PERMISSIONS MANAGEMENT PLAN OPERATION 617 is then stored in a memory, database, or other data storage mechanism. In one embodiment, the pattern-based permissions management plan data of GENERATE PATTERN-BASED PERMISSIONS MANAGEMENT PLAN DATA REPRESENTING THE REFERENCE ARCHITECTURE PATTERN-BASED PERMISSIONS MANAGEMENT PLAN OPERATION 617 is then provided to one or more processors, processing systems, and/or computing systems which then implement the reference architecture pattern-based permissions management plans represented by the pattern-based permissions management plan data of GENERATE PATTERN-BASED PERMISSIONS MANAGEMENT PLAN DATA REPRESENTING THE REFERENCE ARCHITECTURE PATTERN-BASED PERMISSIONS MANAGEMENT PLAN OPERATION 617.

In one embodiment, once pattern-based permissions management plan data representing each of the reference architecture pattern-based permissions management plans of FOR EACH REFERENCE ARCHITECTURE PATTERN CREATE A REFERENCE ARCHITECTURE PATTERN-BASED PERMISSIONS MANAGEMENT PLAN INDI- CATING THE AT LEAST ONE PERMISSION ASSOCIATED WITH EACH REFERENCE ARCHITECTURE PATTERN ROLE FOR EACH REFERENCE ARCHITECTURE PATTERN TIER OF THE REFERENCE ARCHITECTURE PATTERN OPERATION 615 is generated at GENERATE PATTERN-BASED PERMISSIONS MANAGEMENT PLAN DATA REPRESENTING THE REFERENCE ARCHITECTURE PATTERN-BASED PERMISSIONS MANAGEMENT PLAN OPERATION 617, process flow proceeds to ASSIGN AT LEAST ONE INDIVIDUAL ENTITY ONE OF THE REFERENCE ARCHITECTURE PATTERN ROLES REPRESENTED BY THE REFERENCE ARCHITECTURE PATTERN ROLE DATA OPERATION 619.

In one embodiment, at ASSIGN AT LEAST ONE INDIVIDUAL ENTITY ONE OF THE REFERENCE ARCHITECTURE PATTERN ROLES REPRESENTED BY THE REFERENCE ARCHITECTURE PATTERN ROLE DATA OPERATION 619 for each reference architecture pattern of DEFINE AND/OR IDENTIFY ONE OR MORE REFERENCE ARCHITECTURE PATTERNS ASSOCIATED WITH THE DEVELOPMENT, AND/OR DEPLOYMENT, AND/OR OPERATION OF APPLICATIONS OPERATION 603, and associated reference architecture pattern-based permissions plan of FOR EACH REFERENCE ARCHITECTURE PATTERN CREATE A REFERENCE ARCHITECTURE PATTERN-BASED PERMISSIONS MANAGEMENT PLAN INDICATING THE AT LEAST ONE PERMISSION ASSOCIATED WITH EACH REFERENCE ARCHITECTURE PATTERN ROLE FOR REFERENCE ARCHITECTURE PATTERN TIER OF THE REFERENCE ARCHITECTURE PATTERN, at least one entity is assigned one of the reference architecture pattern roles represented by the reference architecture pattern role data of GENERATE REFERENCE ARCHITECTURE PATTERN ROLE DATA REPRESENTING THE IDENTIFIED REFERENCE ARCHITECTURE PATTERN ROLES OPERATION 611 and included in the pattern-based permissions management plan data representing each of the reference architecture pattern-based permissions management plans of FOR EACH REFERENCE ARCHITECTURE PATTERN CREATE A REFERENCE ARCHITECTURE PATTERN-BASED PERMISSIONS MANAGEMENT PLAN INDICATING THE AT LEAST ONE PERMISSION ASSOCIATED WITH EACH REFERENCE ARCHITECTURE PATTERN ROLE FOR EACH REFERENCE ARCHITECTURE PATTERN TIER OF THE REFERENCE ARCHITECTURE PATTERN OPERATION 615.

In one embodiment, once for each reference architecture pattern, and associated reference architecture pattern-based permissions plan, at least one entity is assigned one of the reference architecture pattern roles represented by the reference architecture pattern role data at ASSIGN AT LEAST ONE INDIVIDUAL ENTITY ONE OF THE REFERENCE ARCHITECTURE PATTERN ROLES REPRESENTED BY THE REFERENCE ARCHITECTURE PATTERN ROLE DATA OPERATION 619, process flow proceeds to USE THE PATTERN-BASED PERMISSIONS MANAGEMENT PLAN DATA TO AUTOMATICALLY PROVIDE THE AT LEAST ONE INDIVIDUAL ENTITY THE AT LEAST ONE PERMISSION ASSOCIATED WITH THE REFERENCE ARCHITECTURE PATTERN ROLE ASSIGNED TO THE INDIVIDUAL ENTITY FOR EACH TIER REPRESENTED IN THE REFERENCE ARCHITECTURE PATTERN TIER DATA OPERATION 621.

In one embodiment, at USE THE PATTERN-BASED PERMISSIONS MANAGEMENT PLAN DATA TO AUTOMATICALLY PROVIDE THE AT LEAST ONE INDIVIDUAL ENTITY THE AT LEAST ONE PERMISSION ASSOCIATED WITH THE REFERENCE ARCHITECTURE PATTERN ROLE ASSIGNED TO THE INDIVIDUAL ENTITY FOR EACH TIER REPRESENTED IN THE REFERENCE ARCHITECTURE PATTERN TIER DATA OPERATION 621, for each reference architecture pattern tier, or cloud computing infrastructure account, represented in the reference architecture pattern tier data of GENERATE REFERENCE ARCHITECTURE PATTERN TIER DATA REPRESENTING THE REFERENCE ARCHITECTURE PATTERN TIERS OPERATION 607, the at least one entity is automatically provided the at least one access and/or operational permission of FOR EACH REFERENCE ARCHITECTURE PATTERN AND FOR EACH REFERENCE ARCHITECTURE PATTERN ROLE REPRESENTED BY THE REFERENCE ARCHITECTURE PATTERN ROLE DATA FOR THAT REFERENCE ARCHITECTURE PATTERN, ASSOCIATE AT LEAST ONE PERMISSION WITH EACH REFERENCE ARCHITECTURE PATTERN tier REPRESENTED IN THE REFERENCE ARCHITECTURE PATTERN TIER DATA OPERATION 613 associated with the reference architecture pattern role assigned to the entity at ASSIGN AT LEAST ONE INDIVIDUAL ENTITY ONE OF THE REFERENCE ARCHITECTURE PATTERN ROLES REPRESENTED BY THE REFERENCE ARCHITECTURE PATTERN ROLE DATA OPERATION 619.

In one embodiment, once, for each reference architecture pattern tier, or cloud computing infrastructure account, represented in the reference architecture pattern tier data, the at least one entity is automatically provided the at least one access and/or operational permission associated with the reference architecture pattern role assigned to the entity at USE THE PATTERN-BASED PERMISSIONS MANAGEMENT PLAN DATA TO AUTOMATICALLY PROVIDE THE AT LEAST ONE INDIVIDUAL ENTITY THE AT LEAST ONE PERMISSION ASSOCIATED WITH THE REFERENCE ARCHITECTURE PATTERN ROLE ASSIGNED TO THE INDIVIDUAL ENTITY FOR EACH TIER REPRESENTED IN THE REFERENCE ARCHITECTURE PATTERN TIER DATA OPERATION 621, process flow proceeds to EXIT OPERATION 630.

In one embodiment, at EXIT OPERATION 630 process 600 for providing reference architecture pattern-based permissions management is exited to await new data.

Using process 600 for providing reference architecture pattern-based permissions management, a given entity, such as a person, taking part in the various stages of the development, deployment, and operation of an application is provided permission, functionality, and operational access based on a role assigned to the entity, and the reference architecture pattern associated with the application, and the tier, e.g., the cloud computing infrastructure provider account, of the reference architecture pattern currently being accessed or used by the entity. Consequently, using process 600 for providing reference architecture pattern-based permissions management, a single role assigned to an entity correlates to different permissions, functionality, and operational access depending on the reference architecture pattern and tier of the reference architecture pattern being accessed.

In addition, using process 600 for providing reference architecture pattern-based permissions management, multiple reference architecture pattern-based permission management plans for various types, or classes, of applications are defined. Then these reference architecture pattern-based permission management plans are used for multiple applications of the same reference architecture pattern type and the permissions for a given entity can be automatically assigned and provided based on the reference architecture pattern in use, and the tier or account associated with the reference architecture pattern being utilized/accessed, and the role assigned to the entity within the reference architecture pattern.

Consequently, using process 600 for providing reference architecture pattern-based permissions management, a permissions management system centered on reference architecture patterns, e.g., blueprints, cookbooks, and templates, for various types, or classes of applications is provided. Then these reference architecture pattern-based permission management systems are used for multiple applications of the same reference architecture pattern type and the permissions for a given entity are automatically assigned and provided based on the reference architecture pattern in use, and the tier or account associated with the reference architecture pattern being utilized/accessed, and the role assigned to the entity within the reference architecture pattern.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for providing reference architecture pattern-based permissions management comprising:

identifying, using a first computing system configured to perform the method for providing reference architecture pattern-based permissions management, one or more roles available to be associated with an individual taking part in the development, and/or deployment, and/or operation of two or more computing system applications using a reference architecture pattern;

generating, using the first computing system, role data representing the identified roles;

identifying, using the first computing system, a plurality of reference tiers used to create, and/or deploy, and/or operate a computing system application using the reference architecture pattern, wherein the plurality of identified reference tiers include at least two selected from a development tier, a pre-production tier, a production tier, a staging tier, an integration tier, a security tier, and an external tier;

generating, using the first computing system, reference tier data representing the identified reference tiers;

for each role represented by the role data, associating, using the first computing system, at least one permission with each reference tier represented in the reference tier data;

assigning, using the first computing system, to the individual one of the roles represented by the role data;

for a first one of the reference tiers associated with a first of the one or more computing system applications and represented in the reference tier data, automatically granting the individual a first permission associated with the role assigned to the individual; and for a second one of the reference tiers associated with a second of the one or more computing system applications and represented in the reference tier data, automatically granting the individual a second permission associated with the role assigned to the individual, wherein the second permission is different from the first permission.

2. The method for providing reference architecture pattern-based permissions management of claim 1 wherein at least part of at least one of the computing system applications are to be deployed in a cloud computing environment.

3. The method for providing reference architecture pattern-based permissions management of claim 1 wherein at least one of the roles represented by the role data is selected from the group of roles consisting of:

a supervisory administrator (SuperAdmin) role;
an administrator (Admin) role;
a security role;
an operator role;
a developer role;
a third party role;
a user role; and
a read-only role.

4. The method for providing reference architecture pattern-based permissions management of claim 1 wherein at least one of the reference tiers represented by the reference tier data is selected from the group of reference tiers consisting of:

a development tier;
a pre-production tier;
a production tier;
a web tier;
a staging tier;
an integration tier; and
a security tier.

5. The method for providing reference architecture pattern-based permissions management of claim 2 wherein at least one of the reference tiers represented by the reference tier data is an account provided by a cloud infrastructure provider.

6. The method for providing reference architecture pattern-based permissions management of claim 5 wherein at least one of the reference tiers represented by the reference tier data is an account provided by the cloud infrastructure provider selected from the group of accounts consisting of:

a development account;
a performance evaluation account;
a security sandbox account;
a pre-production account;
a production account;
a staging account;
an integration account; and
a security account.

7. The method for providing reference architecture pattern-based permissions management of claim 1 wherein at least one permission associated with each tier represented in the reference tier data is a set of two or more permissions associated with each tier represented in the reference tier data.

8. The method for providing reference architecture pattern-based permissions management of claim 7 wherein at least one set of two or more permissions associated with each tier represented in the reference tier data is a set of two or more permissions selected from the group of sets of two or more permissions consisting of:

a super broad permissions set;
a broad permissions set;
a moderate permissions set;
a narrow permissions set;
a forensic permissions set;
a broad forensic permissions set;
a moderate forensic permissions set;
a narrow forensic permissions set;
an administrator permissions set;
a broad administrator permissions set;
a moderate administrator permissions set;
a narrow administrator permissions set;
an integrator permissions set;
a broad integrator permissions set;
a moderate integrator permissions set;
a narrow integrator permissions set;
an end-user permissions set;
a broad end-user permissions set;
a moderate end-user permissions set;
a narrow end-user permissions set;
a read-only permissions set;
a broad read-only permissions set;
a moderate read-only permissions set; and
a narrow read-only permissions set.

9. A system for providing reference architecture pattern-based permissions management comprising:

at least one processor; and
at least one memory coupled to the at least one processor, the at least one memory having stored therein instructions which when executed by any set of the one or more processors, perform a process for providing reference architecture pattern-based permissions management, the process for providing reference architecture pattern-based permissions management including:

identifying, using a first computing system configured to perform the method for providing reference architecture pattern-based permissions management, one or more roles available to be associated with individuals taking part in the development, and/or deployment, and/or operation of two or more computing system applications using a reference architecture pattern;

generating, using the first computing system, role data representing the identified roles;

identifying, using the first computing system, a plurality of reference tiers used to create, and/or deploy, and/or operate a computing system application using the reference architecture pattern, wherein the plurality of identified reference tiers include at least two selected from a development tier, a pre-production tier, a production tier, a staging tier, an integration tier, a security tier, and an external tier;

generating, using the first computing system, reference tier data representing the identified reference tiers;

for each role represented by the role data, associating, using the first computing system, at least one permission with each reference tier represented in the reference tier data;

assigning, using the first computing system, to the individual, one of the roles represented by the role data;

for a first one of the reference tiers associated with a first of the one or more computing system applications and represented in the reference tier data, automatically granting the individual a first permission associated with the role assigned to the individual; and for a second one of the reference tiers associated with a second of the one or more computing system applications and represented in the reference tier data, automatically granting the individual a second permission associated with the role assigned to the individual, wherein the second permission is different from the first permission.

10. The system for providing reference architecture pattern-based permissions management of claim 9 wherein at least part of the two or more computing system applications are to be deployed in a cloud computing environment.

11. The system for providing reference architecture pattern-based permissions management of claim 9 wherein at least one of the roles represented by the role data is selected from the group of roles consisting of:
a supervisory administrator (SuperAdmin) role;
an administrator (Admin) role;
a security role;
an operator role;
a developer role;
a third party role;
a user role; and
a read-only role.

12. The system for providing reference architecture pattern-based permissions management of claim 9 wherein at least one of the reference tiers represented by the reference tier data is selected from the group of reference tiers consisting of:
a development tier;
a web tier
a pre-production tier;
a production tier;
a staging tier;
an integration tier; and
a security tier.

13. The system for providing reference architecture pattern-based permissions management of claim 10 wherein at least one of the reference tiers represented by the reference tier data is an account provided by an cloud infrastructure provider.

14. The system for providing reference architecture pattern-based permissions management of claim 13 wherein at least one of the reference tiers represented by the reference tier data is an account provided by the cloud infrastructure provider selected from the group of accounts consisting of:
a development account;
a pre-production account;
a performance evaluation account;
a security sandbox account;
a production account;
a staging account;
an integration account; and
a security account.

15. The system for providing reference architecture pattern-based permissions management of claim 9 wherein at least one permission associated with each tier represented in the reference tier data is a set of two or more permissions associated with each tier represented in the reference tier data.

16. The system for providing reference architecture pattern-based permissions management of claim 15 wherein at least one set of two or more permissions associated with each tier represented in the reference tier data is a set of two or more permissions selected from the group of sets of two or more permissions consisting of:
a super broad permissions set;
a broad permissions set;
a moderate permissions set;
a narrow permissions set;
a forensic permissions set;
a broad forensic permissions set;
a moderate forensic permissions set;
a narrow forensic permissions set;
an administrator permissions set;
a broad administrator permissions set;
a moderate administrator permissions set;
a narrow administrator permissions set;
an integrator permissions set;
a broad integrator permissions set;
a moderate integrator permissions set;
a narrow integrator permissions set;
an end-user permissions set;
a broad end-user permissions set;
a moderate end-user permissions set;
a narrow end-user permissions set;
a read-only permissions set;
a broad read-only permissions set;
a moderate read-only permissions set; and
a narrow read-only permissions set.

17. A system for providing reference architecture pattern-based permissions management comprising:
an individual access system associated with an individual;
two or more computing system applications to be created, and/or deployed, and/or operated by the individual;
a reference architecture pattern associated with the computing system applications to be created, and/or deployed, and/or operated, the reference architecture pattern including:
role data representing one or more roles to be assigned to individuals taking part in the development, and/or deployment, and/or operation of the computing system applications using the reference architecture pattern;

reference tier data representing reference tiers used to create, and/or deploy, and/or operate the computing system applications using the reference architecture pattern; and permissions data representing at least one permission assigned to each role represented by the role data for each reference tier represented in the reference tier data;

at least one processor; and at least one memory coupled to the at least one processor, the at least one memory having stored therein instructions which when executed by any set of the one or more processors, perform a process for providing reference architecture pattern-based permissions management, the process for providing reference architecture pattern-based permissions management including:

assigning, using a first computing system, the individual one of the reference architecture pattern roles represented by the role data;

for a first one of the reference tiers associated with a first of the one or more computing system applications and represented in the reference tier data, automatically granting, by the first computing system, the individual a first permission associated with the role assigned to the individual; and for a second one of the reference tiers associated with a second of the one or more computing system applications and represented in the reference tier data, automatically granting, by the first computing system, the individual a second permission associated with the role assigned to the individual, wherein the second permission is different from the first permission.

18. The system for providing reference architecture pattern-based permissions management of claim 17 wherein at least part of the computing system applications are to be deployed in a cloud computing environment.

19. The system for providing reference architecture pattern-based permissions management of claim 17 wherein at least one of the roles represented by the role data is selected from the group of roles consisting of:
   a supervisory administrator (SuperAdmin) role;
   an administrator (Admin) role;
   a security role;
   an operator role;
   a developer role;
   a third party role;
   a user role; and
   a read-only role.

20. The system for providing reference architecture pattern-based permissions management of claim 17 wherein at least one of the reference tiers represented by the reference tier data is selected from the group of reference tiers consisting of:
   a development tier;
   a pre-production tier;
   a production tier;
   a staging tier;
   an integration tier; and
   a security tier.

21. The system for providing reference architecture pattern-based permissions management of claim 18 wherein at least one of the reference tiers represented by the reference tier data is an account provided by a cloud infrastructure provider.

22. The system for providing reference architecture pattern-based permissions management of claim 21 wherein at least one of the reference tiers represented by the reference tier data is an account provided by the cloud infrastructure provider selected from the group of accounts consisting of:
   a development account;
   a pre-production account;
   a performance evaluation account;
   a security sandbox account;
   a production account;
   a staging account;
   an integration account; and
   a security account.

23. The system for providing reference architecture pattern-based permissions management of claim 17 wherein at least one permission associated with each tier represented in the reference tier data is a set of two or more permissions associated with each tier represented in the reference tier data.

24. The system for providing reference architecture pattern-based permissions management of claim 23 wherein at least one set of two or more permissions associated with each tier represented in the reference tier data is a set of two or more permissions selected from the group of sets of two or more permissions consisting of:
   a super broad permissions set;
   a broad permissions set;
   a moderate permissions set;
   a narrow permissions set;
   a forensic permissions set;
   a broad forensic permissions set;
   a moderate forensic permissions set;
   a narrow forensic permissions set;
   an administrator permissions set;
   a broad administrator permissions set;
   a moderate administrator permissions set;
   a narrow administrator permissions set;
   an integrator permissions set;
   a broad integrator permissions set;
   a moderate integrator permissions set;
   a narrow integrator permissions set;
   an end-user permissions set;
   a broad end-user permissions set;
   a moderate end-user permissions set;
   a narrow end-user permissions set;
   a read-only permissions set;
   a broad read-only permissions set;
   a moderate read-only permissions set; and
   a narrow read-only permissions set.

25. A method for providing reference architecture pattern-based permissions management comprising:
   defining one or more reference architecture patterns for the development, and/or deployment, and/or operation of two or more computing system applications;
   identifying, using a first computing system configured to perform the method for providing reference architecture pattern-based permissions management, one or more roles to be associated with individuals taking part in the development, and/or deployment, and/or operation of the two or more computing system applications using a reference architecture pattern;
   generating, by the first computing system, data representing the identified roles;
   for each reference architecture pattern, identifying, by the first computing system, reference tiers used to create, and/or deploy, and/or operate a computing system application using the reference architecture pattern, wherein the identified reference tiers include at least two selected from a development tier, a pre-production tier, a production tier, a staging tier, an integration tier, a security tier, and an external tier;

for each reference architecture pattern, generating, by the first computing system, reference tier data representing the identified reference tiers;

for each reference architecture pattern and for each role represented by the role data, associating, using the first computing system, at least one permission with each reference tier represented in the reference tier data;

assigning, using the first computing system, an individual one of the roles represented by the role data;

for a first one of the reference tiers associated with a first of the two or more computing system applications and represented in the reference tier data, automatically granting the individual a first permission associated with the role assigned to the individual; and for a second one of the reference architecture pattern tiers associated with a first of the one or more computing system applications and represented in the reference tier data, automatically granting the individual a second permission associated with the role assigned to the individual, wherein the second permission is different from the first permission.

26. The method for providing reference architecture pattern-based permissions management of claim 25 wherein at least part of the computing system application is to be deployed in a cloud computing environment.

27. The method for providing reference architecture pattern-based permissions management of claim 25 wherein at least one of the roles represented by the role data is selected from the group of roles consisting of:
 a supervisory administrator (SuperAdmin) role;
 an administrator (Admin) role;
 a security role;
 an operator role;
 a developer role;
 a third party role;
 a user role; and
 a read-only role.

28. The method for providing reference architecture pattern-based permissions management of claim 25 wherein at least one of the reference tiers represented by the reference tier data is selected from the group of reference tiers consisting of:
 a development tier;
 a web tier;
 a pre-production tier;
 a production tier;
 a staging tier;
 an integration tier; and
 a security tier.

29. The method for providing reference architecture pattern-based permissions management of claim 26 wherein at least one of the reference tiers represented by the reference tier data is an account provided by an cloud infrastructure provider.

30. The method for providing reference architecture pattern-based permissions management of claim 29 wherein at least one of the reference tiers represented by the reference tier data is an account provided by the cloud infrastructure provider selected from the group of accounts consisting of:
 a development account;
 a pre-production account;
 a performance evaluation account;
 a security sandbox account;
 a production account;
 a staging account;
 an integration account; and
 a security account.

31. The method for providing reference architecture pattern-based permissions management of claim 25 wherein at least one permission associated with each tier represented in the reference tier data is a set of two or more permissions associated with each tier represented in the reference tier data.

32. The method for providing reference architecture pattern-based permissions management of claim 31 wherein at least one set of two or more permissions associated with each tier represented in the reference tier data is a set of two or more permissions selected from the group of sets of two or more permissions consisting of:
 a super broad permissions set;
 a broad permissions set;
 a moderate permissions set;
 a narrow permissions set;
 a forensic permissions set;
 a broad forensic permissions set;
 a moderate forensic permissions set;
 a narrow forensic permissions set;
 an administrator permissions set;
 a broad administrator permissions set;
 a moderate administrator permissions set;
 a narrow administrator permissions set;
 an integrator permissions set;
 a broad integrator permissions set;
 a moderate integrator permissions set;
 a narrow integrator permissions set;
 an end-user permissions set;
 a broad end-user permissions set;
 a moderate end-user permissions set;
 a narrow end-user permissions set;
 a read-only permissions set;
 a broad read-only permissions set;
 a moderate read-only permissions set; and
 a narrow read-only permissions set.

* * * * *